(12) United States Patent
Sinha et al.

(10) Patent No.: US 9,181,430 B2
(45) Date of Patent: Nov. 10, 2015

(54) WEAR AND FRICTION PROPERTIES OF ENGINEERING THERMOPLASTICS WITH ULTRA-HIGH MOLECULAR WEIGHT POLYETHYLENE

(71) Applicant: SABIC Global Technologies B.V., Bergen op Zoom (NL)

(72) Inventors: Reema Sinha, Bangalore (IN); Susanta Mitra, Bangalore (IN); Pramila Sharma, Bangalore (IN); Domenico La Camera, Breda (NL); Mohammad Moniruzzaman, Exton, PA (US)

(73) Assignee: SABIC Global Technologies B.V., Bergen op Zoom (NL)

( * ) Notice: Subject to any disclaimer, the term of this patent is extended or adjusted under 35 U.S.C. 154(b) by 0 days.

(21) Appl. No.: 14/172,145

(22) Filed: Feb. 4, 2014

(65) Prior Publication Data
US 2014/0243466 A1 Aug. 28, 2014

Related U.S. Application Data

(60) Provisional application No. 61/770,758, filed on Feb. 28, 2013.

(51) Int. Cl.
| | |
|---|---|
| *C08F 283/08* | (2006.01) |
| *C08L 79/08* | (2006.01) |
| *C08L 67/02* | (2006.01) |
| *C08L 71/02* | (2006.01) |
| *C08L 71/08* | (2006.01) |
| *C08L 77/02* | (2006.01) |
| *C08L 77/06* | (2006.01) |
| *C08L 77/00* | (2006.01) |

(52) U.S. Cl.
CPC ............... *C08L 79/08* (2013.01); *C08L 67/02* (2013.01); *C08L 71/02* (2013.01); *C08L 71/08* (2013.01); *C08L 77/00* (2013.01); *C08L 77/02* (2013.01); *C08L 77/06* (2013.01); *C08L 2207/068* (2013.01)

(58) Field of Classification Search
USPC .......................................................... 524/494
See application file for complete search history.

(56) References Cited

U.S. PATENT DOCUMENTS 4,670,508 A * 6/1987 Ohdaira et al. ................. 525/64

* cited by examiner

*Primary Examiner* — Ling Choi
*Assistant Examiner* — Thuy-Ai Nguyen
(74) *Attorney, Agent, or Firm* — Baker Hostetler LLP

(57) ABSTRACT

Disclosed herein are compositions comprising a polymer comprising polyetherimide, polyetheretherketone, polyamide, polyoxyalkylene, or polyalkylene terephthalate, or a mixture thereof, and ultra-high molecular weight polyethylene, wherein the ultra-high molecular weight polyethylene comprises a surface modifier. Also disclosed are articles comprising one or more of the described compositions. This abstract is intended as a scanning tool for purposes of searching in the particular art and is not intended to be limiting of the present invention.

28 Claims, 21 Drawing Sheets

WEAR AND FRICTION PROPERTIES OF ENGINEERING THERMOPLASTICS WITH ULTRA-HIGH MOLECULAR WEIGHT POLYETHYLENE

CROSS-REFERENCE TO RELATED APPLICATIONS

This application claims the benefit of U.S. Provisional Application No. 61/770,758, filed on Feb. 28, 2013, which is incorporated herein by reference in its entirety.

BACKGROUND

Ultra-high molecular weight polyethylene (UHMWPE) has an extremely high melt viscosity that makes conventional processing techniques like screw extrusion and injection molding difficult to accomplish. As such, use of UHMWPE is limited. Polyetherimide (PEI) and polyetheretherketone (PEEK) are used in a variety of lubricated applications such as gears, bearings, and rollers, for example.

Polytetrafluoroethylene (PTFE) is a common lubricating agent used in polymers. PTFE has the ability to form transfer film on the counter surface under specific wear conditions and thus reduces the wear. However, there remains a need for other and improved lubricating agents in polymers especially where the application demands improved wear without forming transfer films on counter surface. Further, there is a need for compositions having desired properties such as impact resistance and chemical stability. These and other shortcomings of the prior art are addressed by the present disclosure.

SUMMARY

In accordance with the purpose(s) of the invention, as embodied and broadly described herein, this disclosure, in one aspect, relates to composition comprising a polymer and UHMWPE, wherein the UHMWPE comprises a surface modifier.

Disclosed herein is a composition comprising: from about 30% by weight to about 97% by weight of polymer, wherein the polymer comprises PEI, PEEK, polyamide, polyoxyalkylene, or polyalkylene terephthalate, or a mixture thereof; and from about 3% by weight to about 30% by weight ultra-high molecular weight polyethylene, wherein the UHMWPE comprises above 0% by weight to about 10% by weight of a surface modifier.

Also disclosed herein is an article comprising a composition disclosed herein.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

BRIEF DESCRIPTION OF THE FIGURES

The accompanying figures, which are incorporated in and constitute a part of this specification, illustrate several aspects and together with the description serve to explain the principles of the invention.

Figure 1:
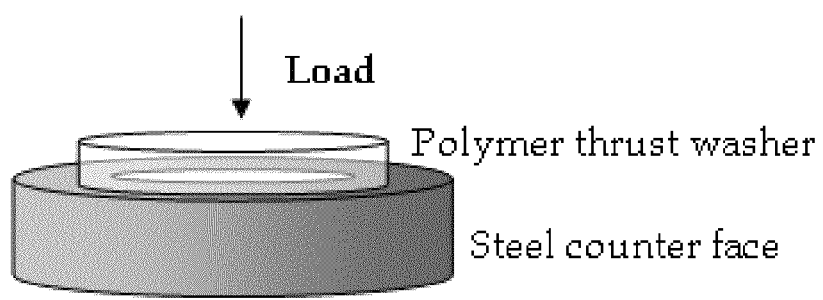
FIG. 1 shows a schematic of the wear testing method.
Figure 2A:
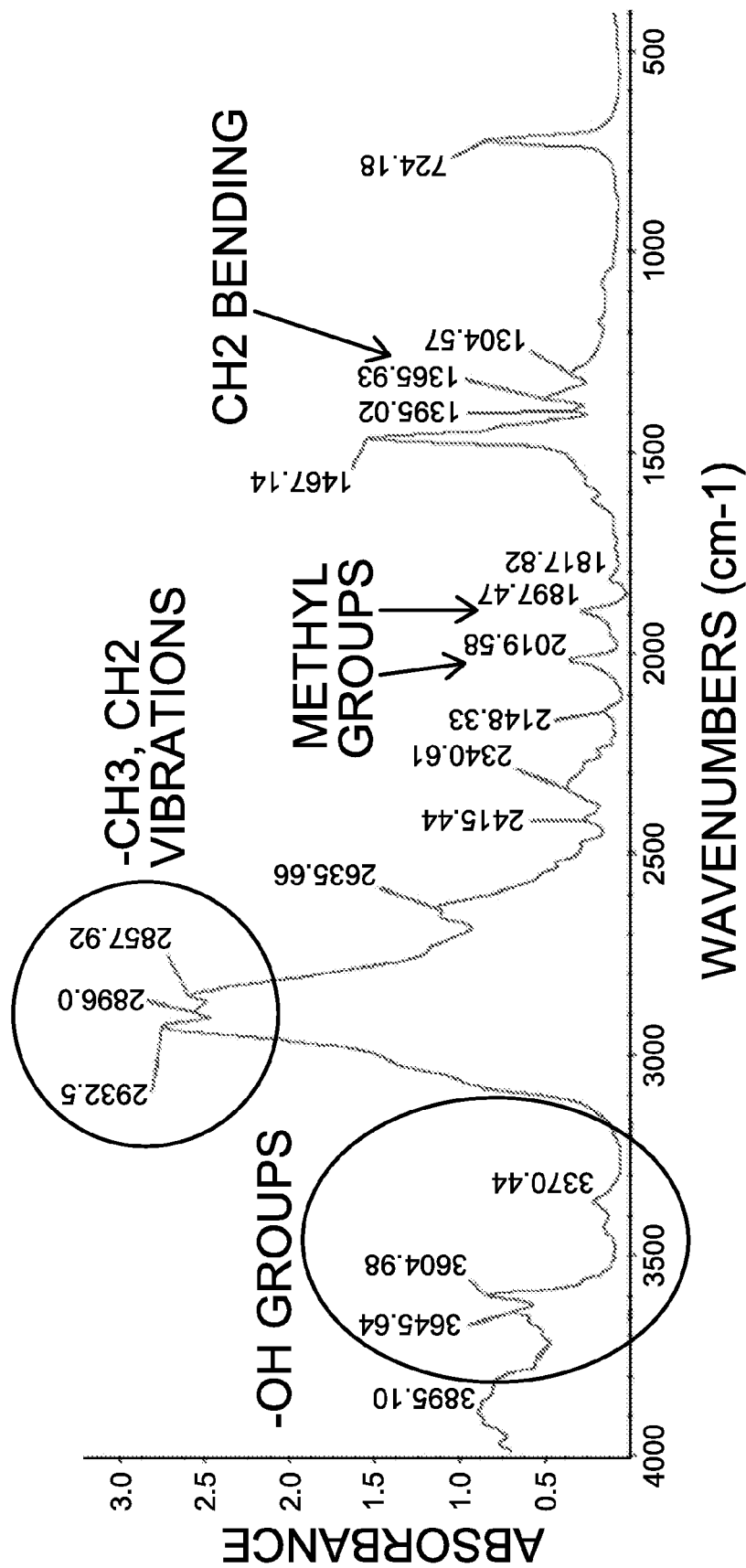
FIGS. 2A, 2B, and 2C show the spectra obtained by infrared spectroscopy (IR) of 2A) MIPELON XM 220; 2B) INHANCE 1250; and 2C) INHANCE 1750.
Figure 2B:
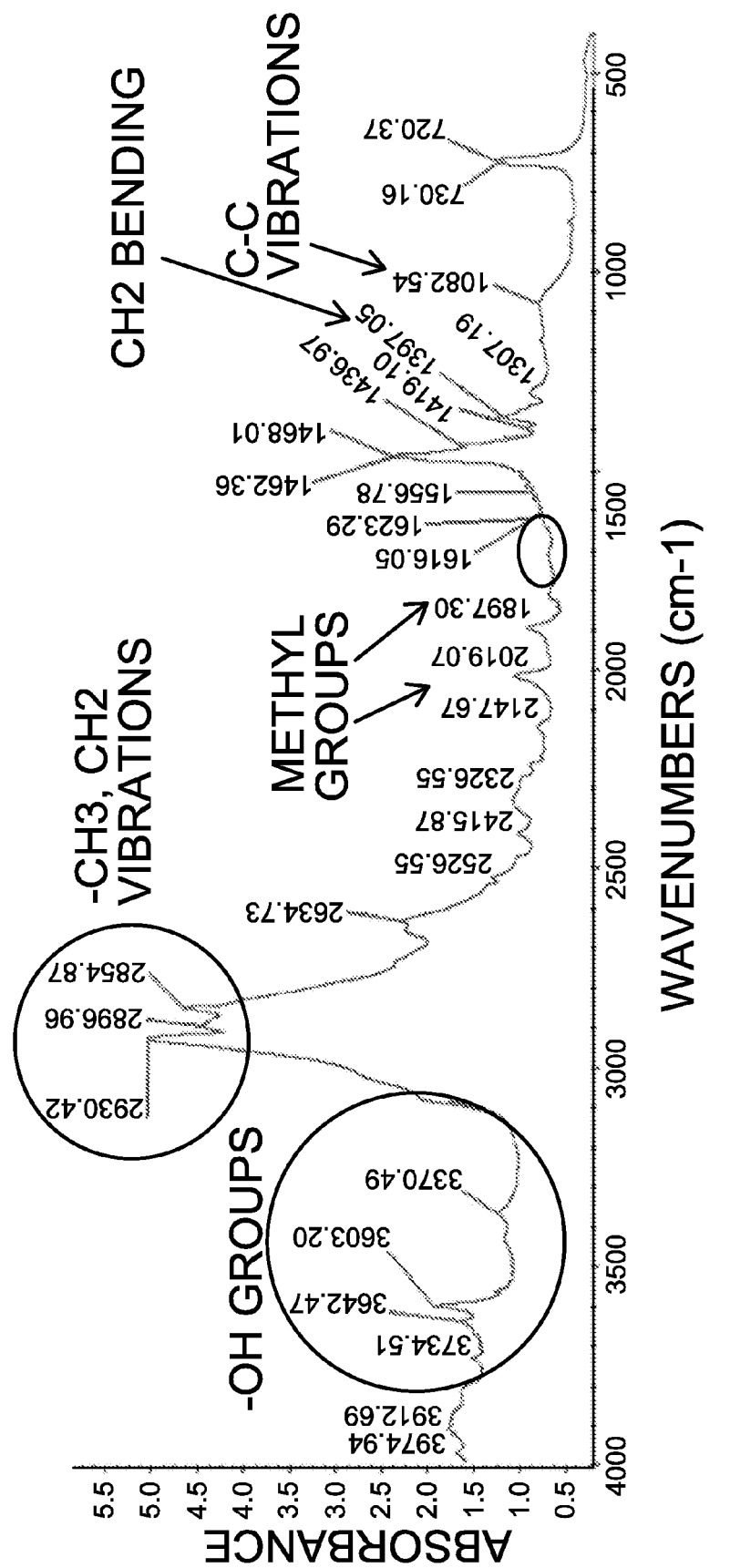
Figure 2C:
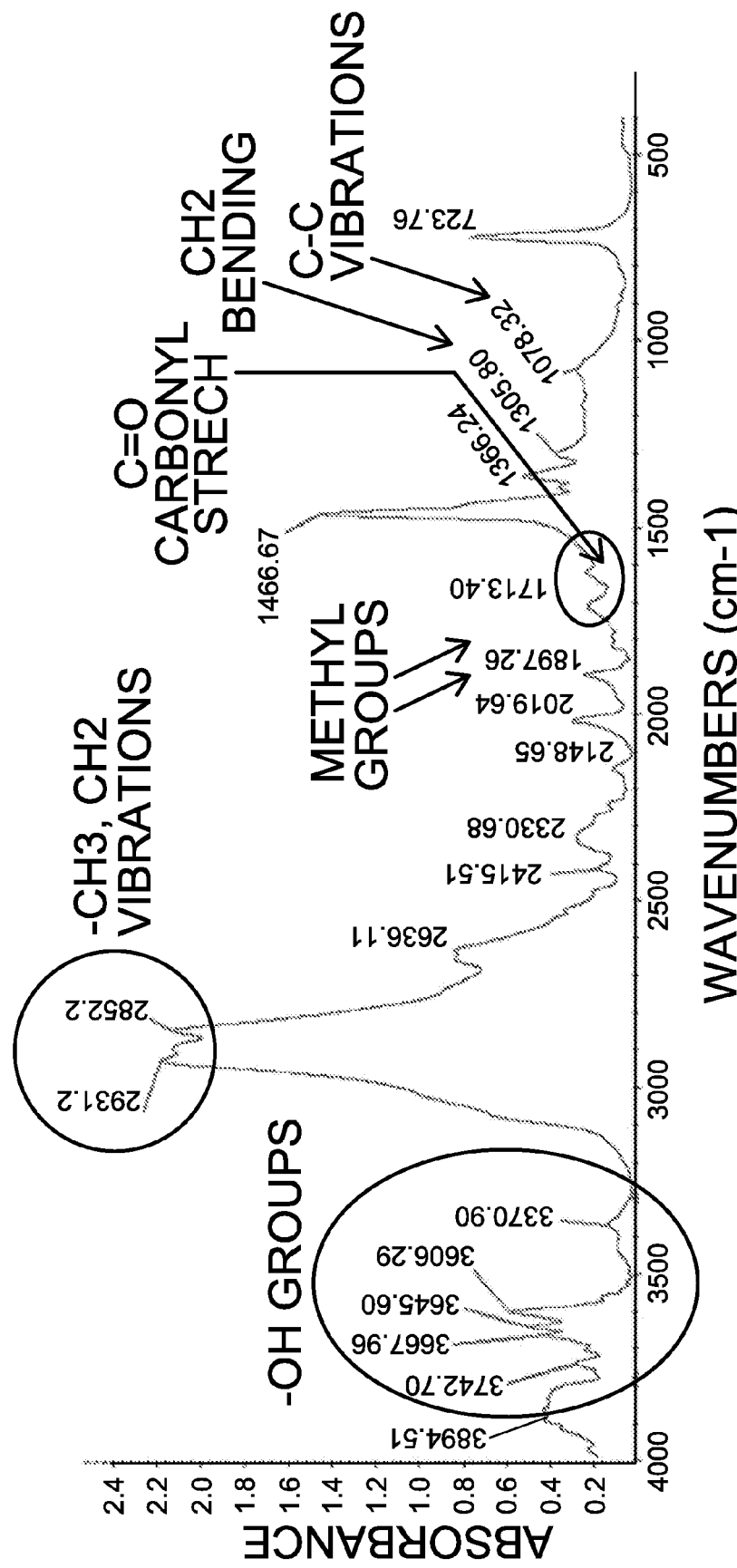
Figure 3A:
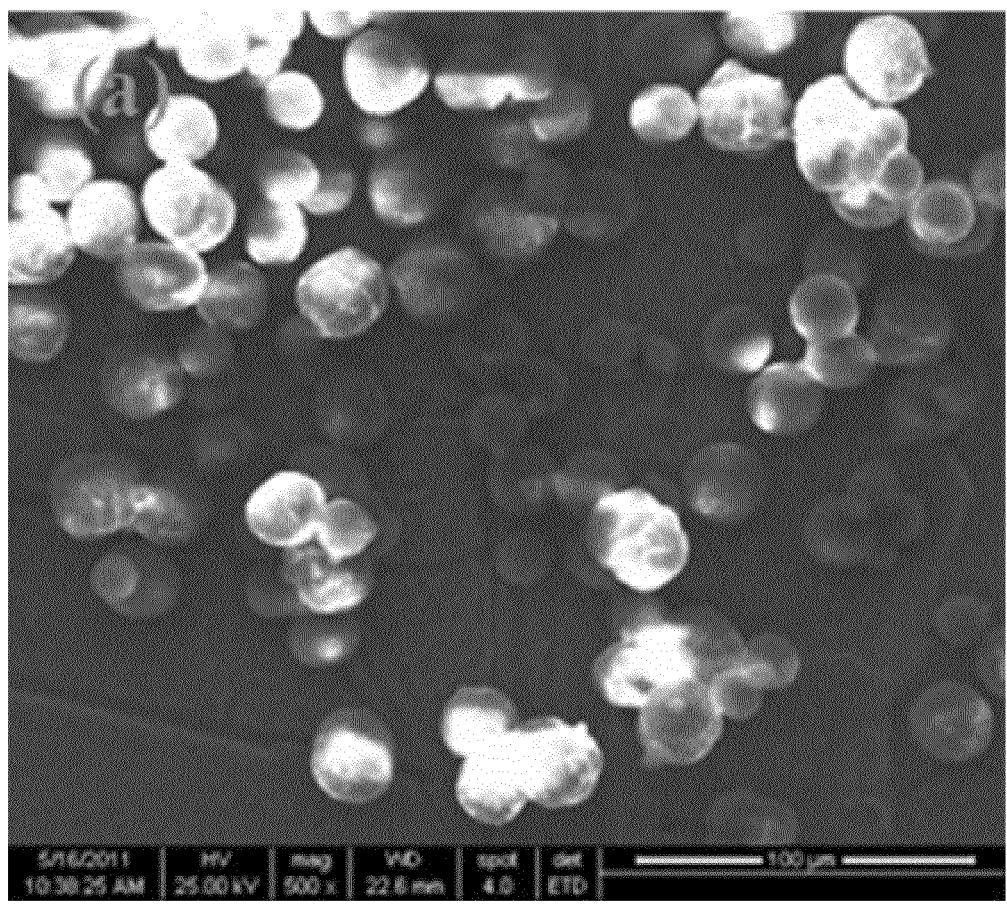
FIGS. 3A and 3B show scanning electron microscopy (SEM) micrographs of 3A) MIPELON XM 220 (Lot No. H10B2154) and 3B) MIPELON XM 220 (Lot No. H10A2130).
Figure 3B:
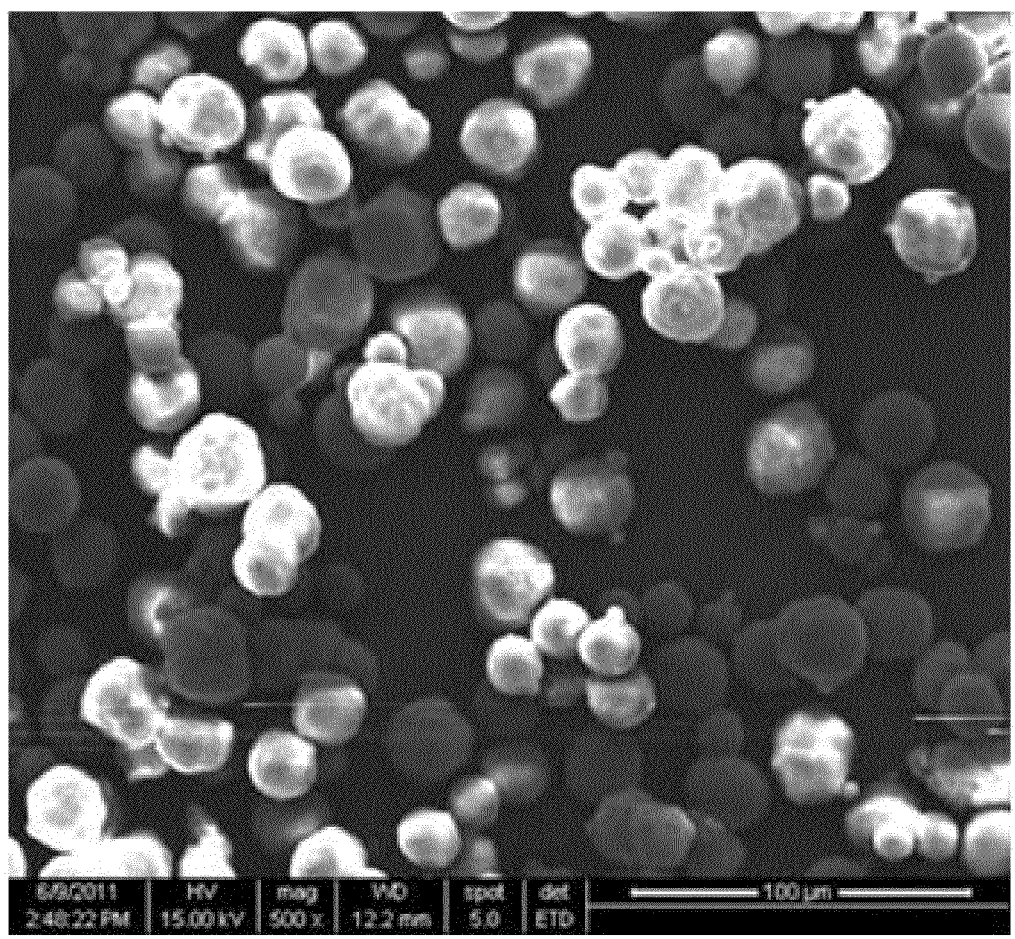

Additional aspects of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DESCRIPTION

Some applications (e.g. transmission seal rings) require high PV (pressure-velocity) wear performance of the materials. High PV wear (PV≥100,000 psi-ft/min) generates frictional heat and performance failure often occurs due to the melting of the material. Materials with low melting temperatures fail prematurely at high PV wear conditions and, therefore, these types of materials are not generally suitable for high PV applications. PTFE has a high melting temperature (~330° C.) with excellent lubrication properties and, therefore, it is commonly used as wear material/additive in thermoplastic compositions that targets high PV applications. UHMWPE has a low melting temperature (~142° C.), so it is expected that UHMWPE filled engineering thermoplastics will fail in high PV wear conditions if the frictional heat exceeds the melt temperature of the UHMWPE. Surprisingly, the compositions described herein comprising UHMWPE can outperform similar thermoplastic compositions with PTFE at high PV conditions.

The present invention can be understood more readily by reference to the following detailed description of the invention and the Examples included therein.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

All publications mentioned herein are incorporated herein by reference to disclose and describe the methods and/or materials in connection with which the publications are cited.

A. Definitions

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, example methods and materials are now described.

As used in the specification and the appended claims, the singular forms "a," "an" and "the" include plural referents unless the context clearly dictates otherwise. Thus, for example, reference to "a nanocomposite" includes mixtures of two or more nanocomposites, and the like.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "optional" or "optionally" means that the subsequently described event or circumstance can or cannot occur, and that the description includes instances where said event or circumstance occurs and instances where it does not.

As used herein, the term "ULTEM" refers to a specific brand of polymers from the family of PEIs sold by Saudi Basic Industries Corporation (SABIC) Innovative Plastics. ULTEM is a registered trademark of SABIC Innovative Plastics IP B.V. ULTEM can have elevated thermal resistance, high strength and stiffness, and broad chemical resistance. ULTEM as used herein refers to any or all ULTEM polymers included in the family unless otherwise specified.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific embodiment or combination of embodiments of the methods of the invention.

As used herein, the term "surface treated" refers to a material, such as, for example, a polymer, that has been exposed to conditions that incorporate one or more surface modifiers onto or into the material to provide with specific chemical surface functionality for specific purposes, e.g., improved processability, dispersion, and compatibility/interaction with other materials, such as a polymer. The surface modifiers can be physically and/or covalently bound to the material via the surface treatment. Materials can be surface treated via, for example, exposing the material to an atmosphere comprising surface modifier precursor. The atmosphere can be a plasma generated in, for example, a reactive ion etching or inductively coupled plasma instrument. The material can also be surface treated via wet chemistry reactions. Thus, for example, surface treated UHMWPE refers to UHMWPE comprising one or more surface modifiers.

The term "untreated" as used in conjunction with a polymer, refers to a polymer that has not been surface treated and, therefore, does not comprise surface modifiers. Therefore, the difference between the surface chemical functionality and the bulk chemical functionality is insignificant. For example, untreated INHANCE 1250 refers to INHANCE 1250 without surface modifiers.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

B. Compositions

Disclosed herein is a composition comprising: from about 30% by weight to about 97% by weight of polymer, wherein the polymer comprises PEI, PEEK, polyamide, polyoxyalkylene, or polyalkylene terephthalate, or a mixture thereof; and from about 3% by weight to about 30% by weight UHMWPE, wherein the UHMWPE comprises above 0% by weight to about 10% by weight of a surface modifier.

In one aspect, the composition comprises PEI. In another aspect, the composition comprises PEEK. In yet another aspect, the composition comprises PEI and PEEK. In yet another aspect, the composition comprises polyamide. In yet another aspect, the composition comprises polyoxyalkylene. In yet another aspect, the composition comprises polyalkylene terephthalate.

In one aspect, the composition can comprise about 5% by weight to about 25% by weight UHMWPE. In one aspect, the composition can comprise about 5% by weight to about 20% by weight UHMWPE. In yet another aspect, one aspect, the composition can comprise about 10% by weight to about 20% by weight UHMWPE. In yet another aspect, one aspect, the composition can comprise about 10% by weight to about 25% by weight UHMWPE. In yet another aspect, one aspect, the composition can comprise about 5% by weight UHMWPE. In yet another aspect, the composition can comprise about 10% by weight UHMWPE. In yet another aspect, the composition can comprise about 15% by weight UHMWPE. In yet another aspect, the composition can comprise about 20% by weight UHMWPE. In yet another aspect, the composition can comprise about 25% by weight UHMWPE. In yet another aspect, the composition can comprise about 30% by weight UHMWPE.

In one aspect, the composition can comprise about 30% by weight to about 97% by weight PEI or PEEK, or a mixture thereof. In another aspect, the composition can comprise about 60% by weight to about 95% by weight PEI or PEEK, or a mixture thereof. In yet another aspect, the composition can comprise about 60% by weight to about 90% by weight PEI or PEEK, or a mixture thereof. In yet another aspect, the composition can comprise about 60% by weight to about 80% by weight PEI or PEEK, or a mixture thereof. In yet another aspect, the composition can comprise about 70% by weight to about 95% by weight PEI or PEEK, or a mixture thereof. In yet another aspect, the composition can comprise about 70% by weight to about 90% by weight PEI or PEEK, or a mixture thereof. In yet another aspect, the composition can comprise about 70% by weight to about 80% by weight PEI or PEEK, or a mixture thereof. In yet another aspect, the composition can comprise about 50% by weight PEI or PEEK, or a mixture thereof. In yet another aspect, the composition can comprise about 55% by weight PEI or PEEK, or a mixture thereof. In yet another aspect, the composition can comprise about 60% by weight PEI or PEEK, or a mixture thereof. In yet another aspect, the composition can comprise about 65% by weight PEI or PEEK, or a mixture thereof. In yet another aspect, the composition can comprise about 70% by weight PEI or PEEK, or a mixture thereof. In yet another aspect, the composition can comprise about 75% by weight PEI or PEEK, or a mixture thereof. In yet another aspect, the composition can comprise about 80% by weight PEI or PEEK, or a mixture thereof. In yet another aspect, the composition can comprise about 85% by weight PEI or PEEK, or a mixture thereof. In yet another aspect, the composition can comprise about 90% by weight PEI or PEEK, or a mixture thereof. In yet another aspect, the composition can comprise about 95% by weight PEI or PEEK, or a mixture thereof.

In one aspect, the composition can comprise about 30% by weight to about 97% by weight PEI. In another aspect, the composition can comprise about 60% by weight to about 95% by weight PEI. In yet another aspect, the composition can comprise about 60% by weight to about 90% by weight PEI. In yet another aspect, the composition can comprise about 60% by weight to about 80% by weight PEI. In yet another aspect, the composition can comprise about 70% by weight to about 95% by weight PEI. In yet another aspect, the composition can comprise about 70% by weight to about 90% by weight PEI. In yet another aspect, the composition can comprise about 70% by weight to about 80% by weight PEI. In yet another aspect, the composition can comprise about 50% by weight PEI. In yet another aspect, the composition can comprise about 55% by weight PEI. In yet another aspect, the composition can comprise about 60% by weight PEI. In yet another aspect, the composition can comprise about 65% by weight PEI. In yet another aspect, the composition can comprise about 70% by weight PEI. In yet another aspect, the composition can comprise about 75% by weight PEI. In yet another aspect, the composition can comprise about 80% by weight PEI. In yet another aspect, the composition can comprise about 85% by weight PEI. In yet another aspect, the composition can comprise about 90% by weight PEI. In yet another aspect, the composition can comprise about 95% by weight PEI.

In one aspect, the composition can comprise about 30% by weight to about 97% by weight PEEK. In another aspect, the composition can comprise about 60% by weight to about 95% by weight PEEK. In yet another aspect, the composition can comprise about 60% by weight to about 90% by weight PEEK. In yet another aspect, the composition can comprise about 60% by weight to about 80% by weight PEEK. In yet another aspect, the composition can comprise about 70% by weight to about 95% by weight PEEK. In yet another aspect, the composition can comprise about 70% by weight to about 90% by weight PEEK. In yet another aspect, the composition can comprise about 70% by weight to about 80% by weight PEEK. In yet another aspect, the composition can comprise about 50% by weight PEEK. In yet another aspect, the composition can comprise about 55% by weight PEEK. In yet another aspect, the composition can comprise about 60% by weight PEEK. In yet another aspect, the composition can comprise about 65% by weight PEEK. In yet another aspect, the composition can comprise about 70% by weight PEEK. In yet another aspect, the composition can comprise about 75% by weight PEEK. In yet another aspect, the composition can comprise about 80% by weight PEEK. In yet another aspect, the composition can comprise about 85% by weight PEEK. In yet another aspect, the composition can comprise about 90% by weight PEEK. In yet another aspect, the composition can comprise about 95% by weight PEEK.

In one aspect, the composition can comprise about 30% by weight to about 97% by weight polyamide. In another aspect, the composition can comprise about 60% by weight to about 95% by weight polyamide. In yet another aspect, the composition can comprise about 60% by weight to about 90% by weight polyamide. In yet another aspect, the composition can comprise about 60% by weight to about 80% by weight polyamide. In yet another aspect, the composition can comprise about 70% by weight to about 95% by weight polyamide. In yet another aspect, the composition can comprise about 70% by weight to about 90% by weight polyamide. In yet another aspect, the composition can comprise about 70% by weight to about 80% by weight polyamide. In yet another aspect, the composition can comprise about 50% by weight polyamide. In yet another aspect, the composition can comprise about 55% by weight polyamide. In yet another aspect, the composition can comprise about 60% by weight polyamide. In yet another aspect, the composition can comprise about 65% by weight polyamide. In yet another aspect, the composition can comprise about 70% by weight polyamide. In yet another aspect, the composition can comprise about 75% by weight polyamide. In yet another aspect, the composition can comprise about 80% by weight polyamide. In yet another aspect, the composition can comprise about 85% by weight polyamide. In yet another aspect, the composition can comprise about 90% by weight polyamide. In yet another aspect, the composition can comprise about 95% by weight polyamide.

In one aspect, the composition can comprise about 30% by weight to about 97% by weight polyalkylene terephthalate. In another aspect, the composition can comprise about 60% by weight to about 95% by weight polyalkylene terephthalate. In yet another aspect, the composition can comprise about 60% by weight to about 90% by weight polyalkylene terephthalate. In yet another aspect, the composition can comprise about 60% by weight to about 80% by weight polyalkylene terephthalate. In yet another aspect, the composition can comprise about 70% by weight to about 95% by weight polyalkylene terephthalate. In yet another aspect, the composition can comprise about 70% by weight to about 90% by weight polyalkylene terephthalate. In yet another aspect, the composition can comprise about 70% by weight to about 80% by weight polyalkylene terephthalate. In yet another aspect, the composition can comprise about 50% by weight polyalkylene terephthalate. In yet another aspect, the composition can comprise about 55% by weight polyalkylene terephthalate. In yet another aspect, the composition can comprise about 60% by weight polyalkylene terephthalate. In yet another aspect, the composition can comprise about 65% by weight polyalkylene terephthalate. In yet another aspect, the composition can comprise about 70% by weight polyalkylene terephthalate. In yet another aspect, the composition can comprise about 75% by weight polyalkylene terephthalate. In yet another aspect, the composition can comprise about 80% by weight polyalkylene terephthalate. In yet another aspect, the composition can comprise about 85% by weight polyalkylene terephthalate. In yet another aspect, the composition can comprise about 90% by weight polyalkylene terephthalate. In yet another aspect, the composition can comprise about 95% by weight polyalkylene terephthalate.

In one aspect, the composition can comprise about 30% by weight to about 97% by weight polyoxyalkylene. In another aspect, the composition can comprise about 60% by weight to about 95% by weight polyoxyalkylene. In another aspect, the composition can comprise about 60% by weight to about 90% by weight polyoxyalkylene. In yet another aspect, the composition can comprise about 60% by weight to about 80% by weight polyoxyalkylene. In yet another aspect, the composition can comprise about 70% by weight to about 95% by weight polyoxyalkylene. In yet another aspect, the composition can comprise about 70% by weight to about 90% by weight polyoxyalkylene. In yet another aspect, the composition can comprise about 70% by weight to about 80% by weight polyoxyalkylene. In yet another aspect, the composition can comprise about 50% by weight polyoxyalkylene. In yet another aspect, the composition can comprise about 55% by weight polyoxyalkylene. In yet another aspect, the composition can comprise about 60% by weight polyoxyalkylene. In yet another aspect, the composition can comprise about 65% by weight polyoxyalkylene. In yet another aspect, the composition can comprise about 70% by weight polyoxyalkylene. In yet another aspect, the composition can comprise about 75% by weight polyoxyalkylene. In yet another aspect, the composition can comprise about 80% by weight polyoxyalkylene. In yet another aspect, the composition can comprise about 85% by weight polyoxyalkylene. In yet another aspect, the composition can comprise about 90% by polyoxyalkylene. In yet another aspect, the composition can comprise about 95% by weight polyoxyalkylene.

In one aspect, the composition can comprise about 5% by weight to about 60% by weight reinforcement agent. In another aspect, the composition can comprise about 10% by weight to about 60% by weight reinforcement agent. In yet another aspect, the composition can comprise about 15% by weight to about 60% by weight reinforcement agent. In yet another aspect, the composition can comprise about 20% by weight to about 60% by weight reinforcement agent. In yet another aspect, the composition can comprise about 20% by weight to about 60% by weight reinforcement agent. In yet another aspect, the composition can comprise about 30% by weight to about 60% by weight reinforcement agent. In yet another aspect, the composition can comprise about 40% by weight to about 60% by weight reinforcement agent. In yet another aspect, the composition can comprise about 50% by weight to about 60% by weight reinforcement agent. In yet another aspect, the composition can comprise about 5% by weight to about 30% by weight reinforcement agent. In yet another aspect, the composition can comprise about 10% by weight to about 30% by weight reinforcement agent. In yet another aspect, the composition can comprise about 15% by weight to about 30% by weight reinforcement agent. In yet another aspect, the composition can comprise about 20% by weight to about 60% by weight reinforcement agent. In yet another aspect, the composition can comprise above 0% by weight to about 25% by weight reinforcement agent. In yet another aspect, the composition can comprise above 0% by weight to about 20% by weight reinforcement agent. In yet another aspect, the composition can comprise above 0% by weight to about 15% by weight reinforcement agent. In yet another aspect, the composition can comprise above 0% by weight to about 10% by weight reinforcement agent. In yet another aspect, the composition can comprise 5% by weight reinforcement agent. In yet another aspect, the composition can comprise about 10% by weight reinforcement agent. In yet another aspect, the composition can comprise about 15% by weight reinforcement agent. In yet another aspect, the composition can comprise about 20% by weight reinforcement agent. In yet another aspect, the composition can comprise about 25% by weight reinforcement agent.

In one aspect, the composition can comprise about 10% by weight to about 20% by weight reinforcement agent, about 10% by weight to about 20% by weight UHMWPE, and about 60% by weight to about by weight 80% PEI or PEEK, or a mixture thereof. In another aspect, the composition can comprise about 10% by weight to about 30% by weight reinforcement agent, about 10% by weight to about 30% by weight UHMWPE, and about 50% by weight to about by weight 80% PEI or PEEK, or a mixture thereof. In yet another aspect, the composition can comprise about 10% by weight to about 60% by weight reinforcement agent, about 10% by weight to about 30% by weight UHMWPE, and about 30% by weight to about by weight 80% PEI or PEEK, or a mixture thereof. In yet another aspect, the composition can comprise about 15% by weight reinforcement agent, about 15% by weight UHMWPE, and about 70% by weight PEI or PEEK, or a mixture thereof.

In one aspect, the composition can comprise about 10% by weight to about 20% by weight reinforcement agent, about 10% by weight to about 20% by weight UHMWPE, and about 60% by weight to about by weight 80% polyamide. In another aspect, the composition can comprise about 10% by weight to about 30% by weight reinforcement agent, about 10% by weight to about 30% by weight UHMWPE, and about 50% by weight to about by weight 80% polyamide. In yet another aspect, the composition can comprise about 10% by weight to about 60% by weight reinforcement agent, about 10% by weight to about 30% by weight UHMWPE, and about 30% by weight to about by weight 80% polyamide. In yet another aspect, the composition can comprise about 15% by weight reinforcement agent, about 15% by weight UHMWPE, and about 70% by weight polyamide.

In one aspect, the composition can comprise about 10% by weight to about 20% by weight reinforcement agent, about 10% by weight to about 20% by weight UHMWPE, and about 60% by weight to about by weight 80% polyoxyalkylene. In another aspect, the composition can comprise about 10% by weight to about 30% by weight reinforcement agent, about 10% by weight to about 30% by weight UHMWPE, and about 50% by weight to about by weight 80% polyoxyalkylene. In yet another aspect, the composition can comprise about 10% by weight to about 60% by weight reinforcement agent, about 10% by weight to about 30% by weight UHMWPE, and about 30% by weight to about by weight 80% polyoxyalkylene. In yet another aspect, the composition can comprise about 15% by weight reinforcement agent, about 15% by weight UHMWPE, and about 70% by polyoxyalkylene.

In one aspect, the composition can comprise about 10% by weight to about 20% by weight reinforcement agent, about 10% by weight to about 20% by weight UHMWPE, and about 60% by weight to about by weight 80% polyalkylene terephthalate. In another aspect, the composition can comprise about 10% by weight to about 30% by weight reinforcement agent, about 10% by weight to about 30% by weight UHMWPE, and about 50% by weight to about by weight 80% polyalkylene terephthalate. In yet another aspect, the composition can comprise about 10% by weight to about 60% by weight reinforcement agent, about 10% by weight to about 30% by weight UHMWPE, and about 30% by weight to about by weight 80% polyalkylene terephthalate. In yet another aspect, the composition can comprise about 15% by weight reinforcement agent, about 15% by weight UHMWPE, and about 70% by weight polyalkylene terephthalate.

In one aspect, the UHMWPE comprises above 0% by weight to 8% by weight of a surface modifier. In another aspect, the UHMWPE comprises above 0% by weight to 6% by weight of a surface modifier. In yet another aspect, the UHMWPE comprises above 0% by weight to 4% by weight of a surface modifier. In yet another aspect, the UHMWPE comprises above 0% by weight to 2% by weight of a surface modifier. In yet another aspect, the UHMWPE comprises above 0% by weight to 1% by weight of a surface modifier. In yet another aspect, the UHMWPE comprises above 0% by weight to 0.5% by weight of a surface modifier. In yet another aspect, the UHMWPE comprises about 0.01% by weight to 2% by weight of a surface modifier. In yet another aspect, the UHMWPE comprises about 0.01% by weight to 1% by weight of a surface modifier. In yet another aspect, the UHMWPE comprises about 0.01% by weight to 0.5% by weight of a surface modifier. In yet another aspect, the UHMWPE comprises about 0.01% by weight to 0.2% by weight of a surface modifier. In yet another aspect, the UHMWPE comprises about 0.01% by weight to 0.15% by weight of a surface modifier. In yet another aspect, the UHMWPE comprises about 0.0001% by weight to 0.10% by weight of a surface modifier. In yet another aspect, the UHMWPE comprises about 0.0001% by weight to 1% by weight of a surface modifier. In yet another aspect, the UHMWPE comprises about 0.0001% by weight to 0.5% by weight of a surface modifier. In yet another aspect, the UHMWPE comprises about 0.0001% by weight to 0.2% by weight of a surface modifier. In yet another aspect, the UHMWPE comprises about 0.0001% by weight to 0.15 by weight of a surface modifier. In yet another aspect, the UHMWPE comprises about 0.0001% by weight to 0.10% by weight of a surface modifier.

In one aspect, the compositions described herein can have a wear factor (KF) and/or coefficient of friction (CoF). The KFs and/or CoF can be determined as described herein by the American Society for Testing Materials (ASTM) D3702 test at various psi and fpm, for example, at 40 psi and 50 fpm; 100 psi and 100 fpm; or at 120 psi and 100 fpm.

In one aspect, the compositions comprising PEI can have a KF of less than 3500 as determined by a test according to ASTM D3702 at 40 psi and 50 fpm. In another aspect, the compositions comprising PEI can have a KF of less than 2500 as determined by a test according to ASTM D3702 at 40 psi and 50 fpm. In yet another aspect, the compositions comprising PEI can have a KF of less than 1500 as determined by a test according to ASTM D3702 at 40 psi and 50 fpm. In yet another aspect, the compositions comprising PEI can have a KF of less than 1000 as determined by a test according to ASTM D3702 at 40 psi and 50 fpm. In yet another aspect, the compositions comprising PEI can have a KF of less than 750 as determined by a test according to ASTM D3702 at 40 psi and 50 fpm. In yet another aspect, the compositions comprising PEI can have a KF of less than 500 as determined by a test according to ASTM D3702 at 40 psi and 50 fpm. In yet another aspect, the compositions comprising PEI can have a KF of less than 300 as determined by a test according to ASTM D3702 at 40 psi and 50 fpm. In yet another aspect, the compositions comprising PEI can have a KF of less than 200 as determined by a test according to ASTM D3702 at 40 psi and 50 fpm. In yet another aspect, the compositions comprising PEI can have a KF of less than 100 as determined by a test according to ASTM D3702 at 40 psi and 50 fpm. In yet another aspect, the compositions comprising PEI can have a KF of less than 75 as determined by a test according to ASTM D3702 at 40 psi and 50 fpm. In yet another aspect, the compositions comprising PEI can have a KF of less than 50 as determined by a test according to ASTM D3702 at 40 psi and 50 fpm.

In one aspect, the compositions comprising PEEK can have a KF of less than 3500 as determined by a test according to ASTM D3702 at 40 psi and 50 fpm. In another aspect, the compositions comprising PEEK can have a KF of less than 2500 as determined by a test according to ASTM D3702 at 40 psi and 50 fpm. In yet another aspect, the compositions comprising PEEK can have a KF of less than 1500 as determined by a test according to ASTM D3702 at 40 psi and 50 fpm. In yet another aspect, the compositions comprising PEEK can have a KF of less than 1000 as determined by a test according to ASTM D3702 at 40 psi and 50 fpm. In yet another aspect, the compositions comprising PEEK can have a KF of less than 750 as determined by a test according to ASTM D3702 at 40 psi and 50 fpm. In yet another aspect, the compositions comprising PEEK can have a KF of less than 500 as determined by a test according to ASTM D3702 at 40 psi and 50 fpm. In yet another aspect, the compositions comprising PEEK can have a KF of less than 300 as determined by a test according to ASTM D3702 at 40 psi and 50 fpm. In yet another aspect, the compositions comprising PEEK can have a KF of less than 200 as determined by a test according to ASTM D3702 at 40 psi and 50 fpm. In yet another aspect, the compositions comprising PEEK can have a KF of less than 100 as determined by a test according to ASTM D3702 at 40 psi and 50 fpm. In yet another aspect, the compositions comprising PEEK can have a KF of less than 75 as determined by a test according to ASTM D3702 at 40 psi and 50 fpm. In yet another aspect, the compositions comprising PEEK can have a KF of less than 50 as determined by a test according to ASTM D3702 at 40 psi and 50 fpm.

In one aspect, the compositions comprising PEI and PEEK can have a KF of less than 3500 as determined by a test according to ASTM D3702 at 40 psi and 50 fpm. In another aspect, the compositions comprising PEI and PEEK can have a KF of less than 2500 as determined by a test according to ASTM D3702 at 40 psi and 50 fpm. In yet another aspect, the compositions comprising PEI and PEEK can have a KF of less than 1500 as determined by a test according to ASTM D3702 at 40 psi and 50 fpm. In yet another aspect, the compositions comprising PEI and PEEK can have a KF of less than 1000 as determined by a test according to ASTM D3702 at 40 psi and 50 fpm. In yet another aspect, the compositions comprising PEI and PEEK can have a KF of less than 750 as determined by a test according to ASTM D3702 at 40 psi and 50 fpm. In yet another aspect, the compositions comprising PEI and PEEK can have a KF of less than 500 as determined by a test according to ASTM D3702 at 40 psi and 50 fpm. In yet another aspect, the compositions comprising PEI and PEEK can have a KF of less than 300 as determined by a test according to ASTM D3702 at 40 psi and 50 fpm. In yet another aspect, the compositions comprising PEI and PEEK can have a KF of less than 200 as determined by a test according to ASTM D3702 at 40 psi and 50 fpm. In yet another aspect, the compositions comprising PEI and PEEK can have a KF of less than 100 as determined by a test according to ASTM D3702 at 40 psi and 50 fpm. In yet another aspect, the compositions comprising PEI and PEEK can have a KF of less than 75 as determined by a test according to ASTM D3702 at 40 psi and 50 fpm. In yet another aspect, the compositions comprising PEI and PEEK can have a KF of less than 50 as determined by a test according to ASTM D3702 at 40 psi and 50 fpm.

In one aspect, the compositions comprising PEI can have a CoF of less than 0.6 as determined by a test according to ASTM D3702 at 40 psi and 50 fpm. In another aspect, the compositions comprising PEI can have a CoF of less than 0.5 as determined by a test according to ASTM D3702 at 40 psi and 50 fpm. In yet another aspect, the compositions comprising PEI can have a CoF of less than 0.4 as determined by a test according to ASTM D3702 at 40 psi and 50 fpm. In yet another aspect, the compositions comprising PEI can have a CoF of less than 0.3 as determined by a test according to ASTM D3702 at 40 psi and 50 fpm. In yet another aspect, the compositions comprising PEI can have a CoF of less than 0.2 as determined by a test according to ASTM D3702 at 40 psi and 50 fpm. In yet another aspect, the compositions comprising PEI can have a CoF of less than 0.1 as determined by a test according to ASTM D3702 at 40 psi and 50 fpm.

In one aspect, the compositions comprising PEEK can have a CoF of less than 0.6 as determined by a test according to ASTM D3702 at 40 psi and 50 fpm. In another aspect, the compositions comprising PEEK can have a CoF of less than 0.5 as determined by a test according to ASTM D3702 at 40 psi and 50 fpm. In yet another aspect, the compositions comprising PEEK can have a CoF of less than 0.4 as determined by a test according to ASTM D3702 at 40 psi and 50 fpm. In yet another aspect, the compositions comprising PEEK can have a CoF of less than 0.4 as determined by a test according to ASTM D3702 at 40 psi and 50 fpm. In yet another aspect, the compositions comprising PEEK can have a CoF of less than 0.3 as determined by a test according to ASTM D3702 at 40 psi and 50 fpm. In yet another aspect, the compositions comprising PEEK can have a CoF of less than 0.2 as determined by a test according to ASTM D3702 at 40 psi and 50 fpm. In yet another aspect, the compositions comprising PEEK can have a CoF of less than 0.1 as determined by a test according to ASTM D3702 at 40 psi and 50 fpm.

In one aspect, the compositions comprising PEI and PEEK can have a CoF of less than 0.6 as determined by a test according to ASTM D3702 at 40 psi and 50 fpm. In another aspect, the compositions comprising PEI and PEEK can have a CoF of less than 0.5 as determined by a test according to ASTM D3702 at 40 psi and 50 fpm. In yet another aspect, the compositions comprising PEI and PEEK can have a CoF of less than 0.4 as determined by a test according to ASTM D3702 at 40 psi and 50 fpm. In yet another aspect, the compositions comprising PEI and PEEK can have a CoF of less than 0.4 as determined by a test according to ASTM D3702 at 40 psi and 50 fpm. In yet another aspect, the compositions comprising PEI and PEEK can have a CoF of less than 0.3 as determined by a test according to ASTM D3702 at 40 psi and 50 fpm. In yet another aspect, the compositions comprising PEI and PEEK can have a CoF of less than 0.2 as determined by a test according to ASTM D3702 at 40 psi and 50 fpm. In yet another aspect, the compositions comprising PEI and PEEK can have a CoF of less than 0.1 as determined by a test according to ASTM D3702 at 40 psi and 50 fpm.

In one aspect, the compositions comprising PEI can have a CoF of less than 0.6 as determined by a test according to ASTM D3702 at 120 psi and 100 fpm. In another aspect, the compositions comprising PEI can have a CoF of less than 0.5 as determined by a test according to ASTM D3702 at 120 psi and 100 fpm. In yet another aspect, the compositions comprising PEI can have a CoF of less than 0.4 as determined by a test according to ASTM D3702 at 120 psi and 100 fpm. In yet another aspect, the compositions comprising PEI can have a CoF of less than 0.3 as determined by a test according to ASTM D3702 at 120 psi and 100 fpm. In yet another aspect, the compositions comprising PEI can have a CoF of less than 0.2 as determined by a test according to ASTM D3702 at 120 psi and 100 fpm. In yet another aspect, the compositions comprising PEI can have a CoF of less than 0.1 as determined by a test according to ASTM D3702 at 120 psi and 100 fpm.

In one aspect, the compositions comprising PEI can have a KF of less than 200 as determined by a test according to ASTM D3702 at 120 psi and 100 fpm. In another aspect, the compositions comprising PEI can have a KF of less than 150 as determined by a test according to ASTM D3702 at 120 psi and 100 fpm. In yet another aspect, the compositions comprising PEI can have a KF of less than 100 as determined by a test according to ASTM D3702 at 120 psi and 100 fpm. In yet another aspect, the compositions comprising PEI can have a KF of less than 50 as determined by a test according to ASTM D3702 at 120 psi and 100 fpm. In yet another aspect, the compositions comprising PEI can have a KF of less than 40 as determined by a test according to ASTM D3702 at 120 psi and 100 fpm. In yet another aspect, the compositions comprising PEI can have a KF of less than 30 as determined by a test according to ASTM D3702 at 120 psi and 100 fpm. In yet another aspect, the compositions comprising PEI can have a KF of less than 20 as determined by a test according to ASTM D3702 at 120 psi and 100 fpm. In yet another aspect, the compositions comprising PEI can have a KF of less than 10 as determined by a test according to ASTM D3702 at 120 psi and 100 fpm.

In one aspect, the compositions comprising polyamide can have a KF of less than 300 as determined by a test according to ASTM D3702 at 100 psi and 100 fpm. In another aspect, the compositions comprising polyamide can have a KF of less than 200 as determined by a test according to ASTM D3702 at 100 psi and 100 fpm. In yet another aspect, the compositions comprising polyamide can have a KF of less than 100 as determined by a test according to ASTM D3702 at 100 psi and 100 fpm. In yet another aspect, the compositions comprising polyamide can have a KF of less than 75 as determined by a test according to ASTM D3702 at 100 psi and 100 fpm. In yet another aspect, the compositions comprising polyamide can have a KF of less than 50 as determined by a test according to ASTM D3702 at 100 psi and 100 fpm. In yet another aspect, the compositions comprising polyamide can have a KF of less than 25 as determined by a test according to ASTM D3702 at 100 psi and 100 fpm. In yet another aspect, the compositions comprising polyamide can have a KF of less than 10 as determined by a test according to ASTM D3702 at 100 psi and 100 fpm.

In one aspect, the compositions comprising polyalkylene terephthalate can have a KF of less than 300 as determined by a test according to ASTM D3702 at 100 psi and 100 fpm. In another aspect, the compositions comprising polyalkylene terephthalate can have a KF of less than 200 as determined by a test according to ASTM D3702 at 100 psi and 100 fpm. In yet another aspect, the compositions comprising polyalkylene terephthalate can have a KF of less than 100 as determined by a test according to ASTM D3702 at 100 psi and 100 fpm. In yet another aspect, the compositions comprising polyalkylene terephthalate can have a KF of less than 75 as determined by a test according to ASTM D3702 at 100 psi and 100 fpm. In yet another aspect, the compositions comprising polyalkylene terephthalate can have a KF of less than 50 as determined by a test according to ASTM D3702 at 100 psi and 100 fpm. In yet another aspect, the compositions comprising polyalkylene terephthalate can have a KF of less than 25 as determined by a test according to ASTM D3702 at 100 psi and 100 fpm. In yet another aspect, the compositions comprising polyalkylene terephthalate can have a KF of less than 10 as determined by a test according to ASTM D3702 at 100 psi and 100 fpm.

In one aspect, the compositions comprising polyoxyalkylene can have a KF of less than 1000 as determined by a test according to ASTM D3702 at 100 psi and 100 fpm. In another aspect, the compositions comprising polyoxyalkylene can have a KF of less than 300 as determined by a test according to ASTM D3702 at 100 psi and 100 fpm. In yet another aspect, the compositions comprising polyoxyalkylene can have a KF of less than 100 as determined by a test according to ASTM D3702 at 100 psi and 100 fpm. In yet another aspect, the compositions comprising polyoxyalkylene can have a KF of less than 75 as determined by a test according to ASTM D3702 at 100 psi and 100 fpm. In yet another aspect, the compositions comprising polyoxyalkylene can have a KF of less than 50 as determined by a test according to ASTM D3702 at 100 psi and 100 fpm. In yet another aspect, the compositions comprising polyoxyalkylene can have a KF of less than 25 as determined by a test according to ASTM D3702 at 100 psi and 100 fpm. In yet another aspect, the compositions comprising polyoxyalkylene can have a KF of less than 10 as determined by a test according to ASTM D3702 at 100 psi and 100 fpm.

In one aspect, the compositions comprising polyamide can have a CoF of less than 0.7 as determined by a test according to ASTM D3702 at 100 psi and 100 fpm. In another aspect, the compositions comprising polyamide can have a CoF of less than 0.5 as determined by a test according to ASTM D3702 at 100 psi and 100 fpm. In yet another aspect, the compositions comprising polyamide can have a CoF of less than 0.4 as determined by a test according to ASTM D3702 at 100 psi and 100 fpm. In yet another aspect, the compositions comprising polyamide can have a CoF of less than 0.4 as determined by a test according to ASTM D3702 at 100 psi and 100 fpm. In yet another aspect, the compositions comprising polyamide can have a CoF of less than 0.3 as determined by a test according to ASTM D3702 at 100 psi and 100 fpm. In yet another aspect, the compositions comprising polyamide can have a CoF of less than 0.2 as determined by a test according to ASTM D3702 at 100 psi and 100 fpm.

In one aspect, the compositions comprising polyalkylene terephthalate can have a CoF of less than 0.8 as determined by a test according to ASTM D3702 at 100 psi and 100 fpm. In another aspect, the compositions comprising polyalkylene terephthalate can have a CoF of less than 0.7 as determined by a test according to ASTM D3702 at 100 psi and 100 fpm. In yet another aspect, the compositions comprising polyalkylene terephthalate can have a CoF of less than 0.6 as determined by a test according to ASTM D3702 at 100 psi and 100 fpm. In yet another aspect, the compositions comprising polyalkylene terephthalate can have a CoF of less than 0.5 as determined by a test according to ASTM D3702 at 100 psi and 100 fpm. In yet another aspect, the compositions comprising polyalkylene terephthalate can have a CoF of less than 0.4 as determined by a test according to ASTM D3702 at 100 psi and 100 fpm. In yet another aspect, the compositions comprising polyalkylene terephthalate can have a CoF of less than 0.3 as determined by a test according to ASTM D3702 at 100 psi and 100 fpm.

In one aspect, the compositions comprising PEEK can have a PV of at least 200,000 as determined by a test according to ASTM D3702. In another aspect, the compositions comprising PEEK can have a PV of at least 225,000 as determined by a test according to ASTM D3702. In yet another aspect, the compositions comprising PEEK can have a PV of at least 250,000 as determined by a test according to ASTM D3702. In yet another aspect, the compositions comprising PEEK can have a PV of at least 275,000 as determined by a test according to ASTM D3702. In yet another aspect, the compositions comprising PEEK can have a PV of at least 300,000 as determined by a test according to ASTM D3702. In yet another aspect, the compositions comprising PEEK can have a PV of at least 325,000 as determined by a test according to ASTM D3702. In yet another aspect, the compositions comprising PEEK can have a PV of at least 350,000 as determined by a test according to ASTM D3702. In yet another aspect, the compositions comprising PEEK can have a PV from 200,000 to 350,000 as determined by a test according to ASTM D3702. In yet another aspect, the compositions comprising PEEK can have a PV from 250,000 to 300,000 as determined by a test according to ASTM D3702.

In one aspect, the compositions comprising PPA can have a PV of at least 100,000 as determined by a test according to ASTM D3702. In another aspect, the compositions comprising PPA can have a PV of at least 125,000 as determined by a test according to ASTM D3702. In yet another aspect, the compositions comprising PPA can have a PV of at least 150,000 as determined by a test according to ASTM D3702. In yet another aspect, the compositions comprising PPA can have a PV of at least 175,000 as determined by a test according to ASTM D3702. In yet another aspect, the compositions comprising PPA can have a PV of at least 200,000 as determined by a test according to ASTM D3702. In yet another aspect, the compositions comprising PPA can have a PV of at least 225,000 as determined by a test according to ASTM D3702. In yet another aspect, the compositions comprising PPA can have a PV of at least 250,000 as determined by a test according to ASTM D3702. In yet another aspect, the compositions comprising PPA can have a PV from 100,000 to 250,000 as determined by a test according to ASTM D3702. In yet another aspect, the compositions comprising PPA can have a PV from 150,000 to 200,000 as determined by a test according to ASTM D3702.

In one aspect, the compositions comprising PEI can have a PV of at least 100,000 as determined by a test according to ASTM D3702. In another aspect, the compositions comprising PEI can have a PV of at least 125,000 as determined by a test according to ASTM D3702. In yet another aspect, the compositions comprising PEI can have a PV of at least 150,000 as determined by a test according to ASTM D3702. In yet another aspect, the compositions comprising PEI can have a PV of at least 175,000 as determined by a test according to ASTM D3702. In yet another aspect, the compositions comprising PEI can have a PV of at least 200,000 as determined by a test according to ASTM D3702. In yet another aspect, the compositions comprising PEI can have a PV of at least 225,000 as determined by a test according to ASTM D3702. In yet another aspect, the compositions comprising PEI can have a PV of at least 250,000 as determined by a test according to ASTM D3702. In yet another aspect, the compositions comprising PEI can have a PV of at least 275,000 as determined by a test according to ASTM D3702. In yet another aspect, the compositions comprising PEI can have a PV of at least 300,000 as determined by a test according to ASTM D3702. In yet another aspect, the compositions comprising PEI can have a PV of at least 325,000 as determined by a test according to ASTM D3702. In yet another aspect, the compositions comprising PEI can have a PV of at least 350,000 as determined by a test according to ASTM D3702. In yet another aspect, the compositions comprising PEI can have a PV from 100,000 to 350,000 as determined by a test according to ASTM D3702. In yet another aspect, the compositions comprising PEI can have a PV from 150,000 to 2750,000 as determined by a test according to ASTM D3702.

In one aspect, the compositions comprising polyoxyalkylene can have a PV of at least 100,000 as determined by a test according to ASTM D3702. In another aspect, the compositions comprising polyoxyalkylene can have a PV of at least 125,000 as determined by a test according to ASTM D3702. In yet another aspect, the compositions comprising polyoxyalkylene can have a PV of at least 150,000 as determined by a test according to ASTM D3702. In yet another aspect, the compositions comprising polyoxyalkylene can have a PV of at least 175,000 as determined by a test according to ASTM D3702. In yet another aspect, the compositions comprising polyoxyalkylene can have a PV of at least 200,000 as determined by a test according to ASTM D3702. In yet another aspect, the compositions comprising polyoxyalkylene can have a PV of at least 225,000 as determined by a test according to ASTM D3702. In yet another aspect, the compositions comprising polyoxyalkylene can have a PV of at least 250,000 as determined by a test according to ASTM D3702. In yet another aspect, the compositions comprising polyoxyalkylene can have a PV of at least 275,000 as determined by a test according to ASTM D3702. In yet another aspect, the compositions comprising polyoxyalkylene can have a PV of at least 300,000 as determined by a test according to ASTM D3702. In yet another aspect, the compositions comprising polyoxyalkylene can have a PV of at least 325,000 as determined by a test according to ASTM D3702. In yet another aspect, the compositions comprising polyoxyalkylene can have a PV of at least 350,000 as determined by a test according to ASTM D3702. In yet another aspect, the compositions comprising polyoxyalkylene can have a PV from 100,000 to 350,000 as determined by a test according to ASTM D3702. In yet another aspect, the compositions comprising polyoxyalkylene can have a PV from 150,000 to 2750,000 as determined by a test according to ASTM D3702.

In one aspect, the compositions comprising polyalkylene terephthalate can have a PV of at least 100,000 as determined by a test according to ASTM D3702. In another aspect, the compositions comprising polyalkylene terephthalate can have a PV of at least 125,000 as determined by a test according to ASTM D3702. In yet another aspect, the compositions comprising polyalkylene terephthalate can have a PV of at least 150,000 as determined by a test according to ASTM D3702. In yet another aspect, the compositions comprising polyalkylene terephthalate can have a PV of at least 175,000 as determined by a test according to ASTM D3702. In yet another aspect, the compositions comprising polyalkylene terephthalate can have a PV of at least 200,000 as determined by a test according to ASTM D3702. In yet another aspect, the compositions comprising polyalkylene terephthalate can have a PV of at least 225,000 as determined by a test according to ASTM D3702. In yet another aspect, the compositions comprising polyalkylene terephthalate can have a PV of at least 250,000 as determined by a test according to ASTM D3702. In yet another aspect, the compositions comprising polyalkylene terephthalate can have a PV of at least 275,000 as determined by a test according to ASTM D3702. In yet another aspect, the compositions comprising polyalkylene terephthalate can have a PV of at least 300,000 as determined by a test according to ASTM D3702. In yet another aspect, the compositions comprising polyalkylene terephthalate can have a PV of at least 325,000 as determined by a test according to ASTM D3702. In yet another aspect, the compositions comprising polyalkylene terephthalate can have a PV of at least 350,000 as determined by a test according to ASTM D3702. In yet another aspect, the compositions comprising polyalkylene terephthalate can have a PV from 100,000 to 350,000 as determined by a test according to ASTM D3702. In yet another aspect, the compositions comprising polyalkylene terephthalate can have a PV from 150,000 to 2750,000 as determined by a test according to ASTM D3702.

In one aspect, the compositions comprising polyoxyalkylene can have a CoF of less than 0.7 as determined by a test according to ASTM D3702 at 100 psi and 100 fpm. In another aspect, the compositions comprising polyoxyalkylene can have a CoF of less than 0.5 as determined by a test according to ASTM D3702 at 100 psi and 100 fpm. In yet another aspect, the compositions comprising polyoxyalkylene can have a CoF of less than 0.4 as determined by a test according to ASTM D3702 at 100 psi and 100 fpm. In yet another aspect, the compositions comprising polyoxyalkylene can have a CoF of less than 0.4 as determined by a test according to ASTM D3702 at 100 psi and 100 fpm. In yet another aspect, the compositions comprising polyoxyalkylene can have a CoF of less than 0.3 as determined by a test according to ASTM D3702 at 100 psi and 100 fpm. In yet another aspect, the compositions comprising polyoxyalkylene can have a CoF of less than 0.2 as determined by a test according to ASTM D3702 at 100 psi and 100 fpm.

1. Ultra-High Molecular Weight Polyethylene

UHMWPE has excellent abrasion resistance, impact resistance, fatigue resistance, and chemical resistance properties (B. Derbyshire, et al., *Wear* 181-183 (1995) 258-262; M. Kernick, et al., *Wear* 203 (1997) 537-543; J. Song, et al., *Wear* 225-229 (1999) 716-723). Due to its very high molecular weight, UHMWPE has a very high viscosity due to higher molecular entanglements which prevent its flow in conventional techniques of polymer processing. Therefore, in practice, this material does not flow, thereby limiting its applications. Blends of UHMWPE and low temperature polymers such as olefins and aliphatic polyamides are known in the literature where excellent wear property of UHMWPE has been exploited overcoming its limitations of processability (Z. Yao, et al., *J. Appl. Polym. Sci.* 75 (2000) 232-238; C. Z. Liu. J. Q. Wu, J. Q. et al., *Wear* 260 (2006) 109-115; A. Lucas, et al., *Wear* 270 (2011) 576-583; C. Z. Liu, et al., *Wear* 253 (2002) 878-884; C. Z. Liu, et al., *Wear* 249 (2001) 31-36).

In one aspect, UHMWPE can have the formula:

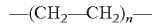

wherein the UHMWPE has a molecular weight of about 2,000,000 g/mol to about 10,000,000 g/mol.

In one aspect, the UHMWPE has a molecular weight of about 2,000,000 g/mol. In another aspect, the UHMWPE has a molecular weight of about 3,000,000 g/mol. In yet another aspect, the UHMWPE has a molecular weight of about 4,000,000 g/mol. In yet another aspect, the UHMWPE has a molecular weight of about 5,000,000 g/mol. In yet another aspect, the UHMWPE has a molecular weight of about 6,000,000 g/mol. In yet another aspect, the UHMWPE has a molecular weight of about 7,000,000 g/mol. In yet another aspect, the UHMWPE has a molecular weight of about 8,000,000 g/mol. In yet another aspect, the UHMWPE has a molecular weight of about 9,000,000 g/mol. In yet another aspect, the UHMWPE has a molecular weight of about 10,000,000 g/mol.

In one aspect, the UHMWPE has a molecular weight of about 2,000,000 g/mol to about 8,000,000 g/mol. In another aspect, the UHMWPE has a molecular weight of about 2,000,000 g/mol to about 6,000,000 g/mol. In yet another aspect, the UHMWPE has a molecular weight of about 2,000,000 g/mol to about 4,000,000 g/mol. In yet another aspect, the UHMWPE has a molecular weight of about 3,000,000 g/mol to about 5,000,000 g/mol. In yet another aspect, the UHMWPE has a molecular weight of about 2,000,000 g/mol to about 6,000,000 g/mol.

In one aspect, the UHMWPE are discrete particles in the composition. In one aspect, at least 80% of the discrete particles have a diameter of about 5 µm to about 130 µm. In another aspect, at least 80% of the discrete particles have a diameter of about 5 µm to about 100 µm. In yet another aspect, at least 80% of the discrete particles have a diameter of about 5 µm to about 80 µm. In yet another aspect, at least 80% of the discrete particles have a diameter of about 5 µm to about 60 µm. In yet another aspect, at least 80% of the discrete particles have a diameter of about 5 µm to about 40 µm. In yet another aspect, at least 80% of the discrete particles have a diameter of about 5 µm to about 20 µm. In yet another aspect, at least 80% of the discrete particles have a diameter of about 10 µm to about 130 µm. In yet another aspect, at least 80% of the discrete particles have a diameter of about 20 µm to about 130 µm. In yet another aspect, at least 80% of the discrete particles have a diameter of about 30 µm to about 130 µm. In yet another aspect, at least 80% of the discrete particles have a diameter of about 10 µm to about 80 µm. In yet another aspect, at least 80% of the discrete particles have a diameter of about 10 µm to about 60 µm. In yet another aspect, at least 80% of the discrete particles have a diameter of about 20 µm to about 130 µm. In yet another aspect, the discrete particles have a diameter of about 20 µm to about 130 µm.

Described herein are compositions where UHMWPE is as lubricating additive in high temperature engineering thermoplastic polymers such as a polymer selected from the group consisting of PEI, PEEK, polyamide, polyoxyalkylene, and polyalkylene terephthalate, or a mixture thereof.

a. Surface Modifier

The UHMWPE described herein have been modified with one or more surface modifiers. The surface modifiers change the surface of UHMWPE from being non-polar to being polar. Such modifications are known in the art and are described in U.S. Pat. Nos. 4,771,110; 4,833,205; 5,382,635; 5,506,283; 5,693,714; and 5,969,053, which are all hereby incorporated by reference in their entirety. For example, the UHMWPE can be exposed to an atmosphere promoting the formation of surface modifiers on the surface of UHMWPE.

In one aspect, the surface modifier is a modifier that makes the surface of UHMWPE polar. Therefore, in one aspect, the surface modifier can be a moiety that increases the polarity of the surface of UHMWPE. Such moieties are known in the art and are within the described compositions.

In one aspect, the surface modifier comprises a halogen. In one aspect, the halogen is fluorine or chlorine. In another aspect, the halogen is fluorine. In yet another aspect, the halogen is chlorine.

In one aspect, the surface modifier comprises one or more oxygen atoms. In another aspect, the surface modifier comprises a carboxyl, hydroxyl, and/or carbonyl moiety. For example, the surface modifier can comprise a carboxylic acid moiety. In another example, the surface modifier can comprise an alcohol moiety. In yet another example, surface modifier can comprise a ketone moiety.

In one aspect, the composition comprises one or more surface modifiers comprising a halogen, a carboxyl, hydroxyl, or carbonyl moiety, or a combination thereof. For example, the composition can comprise a first surface modifier and a second surface modifier, wherein the first surface modifier comprises a halogen and wherein the second surface modifier comprises carboxyl, hydroxyl, or carbonyl moiety, or a combination thereof.

2. Polyetherimide

As disclosed, the compositions comprise PEI. PEI includes PEI copolymers. The PEI can be selected from (i) PEI homopolymers, (ii) PEI co-polymers, e.g., polyetherimidesulfones, and (iii) combinations thereof. PEIs are known polymers and are sold by SABIC Innovative Plastics under the ULTEM, EXTEM®*, and Siltem* brands (Trademarks of SABIC Innovative Plastics IP B.V.).

In an aspect, the PEIs can be of formula (1):

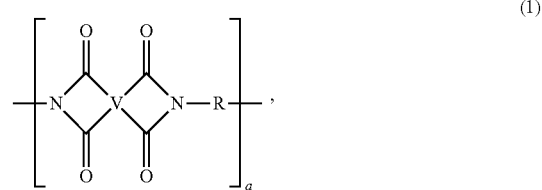

wherein a is more than 1, for example 10 to 1,000 or more, or more specifically 10 to 500. In one example, n can be 10-100, 10-75, 10-50 or 10-25.

The group V in formula (1) is a tetravalent linker containing an ether group (a "PEI" as used herein) or a combination of an ether groups and arylenesulfone groups (a "polyetherimidesulfone"). Such linkers include but are not limited to: (a) substituted or unsubstituted, saturated, unsaturated or aromatic monocyclic and polycyclic groups having 5 to 50 carbon atoms, optionally substituted with ether groups, arylenesulfone groups, or a combination of ether groups and arylenesulfone groups; and (b) substituted or unsubstituted, linear or branched, saturated or unsaturated alkyl groups having 1 to 30 carbon atoms and optionally substituted with ether groups or a combination of ether groups, arylenesulfone groups, and arylenesulfone groups; or combinations comprising at least one of the foregoing. Suitable additional substitutions include, but are not limited to, ethers, amides, esters, and combinations comprising at least one of the foregoing.

The R group in formula (1) includes but is not limited to substituted or unsubstituted divalent organic groups such as: (a) aromatic hydrocarbon groups having 6 to 20 carbon atoms and halogenated derivatives thereof; (b) straight or branched chain alkylene groups having 2 to 20 carbon atoms; (c) cycloalkylene groups having 3 to 20 carbon atoms, or (d) divalent groups of formula (2):

(2)

wherein Q1 includes but is not limited to a divalent moiety such as —O—, —S—, —C(O)—, —SO2-, —SO—, —CyH2y- (y being an integer from 1 to 5), and halogenated derivatives thereof, including perfluoroalkylene groups.

In an embodiment, linkers V include but are not limited to tetravalent aromatic groups of formula (3):

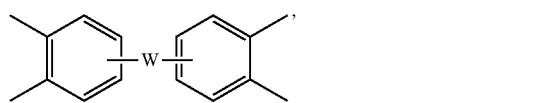
(3)

wherein W is a divalent moiety including —O—, —SO2-, or a group of the formula —O—Z—O— wherein the divalent bonds of the —O— or the —O—Z—O— group are in the 3,3',3,4', 4,3', or the 4,4' positions, and wherein Z includes, but is not limited, to divalent groups of formulas (4):

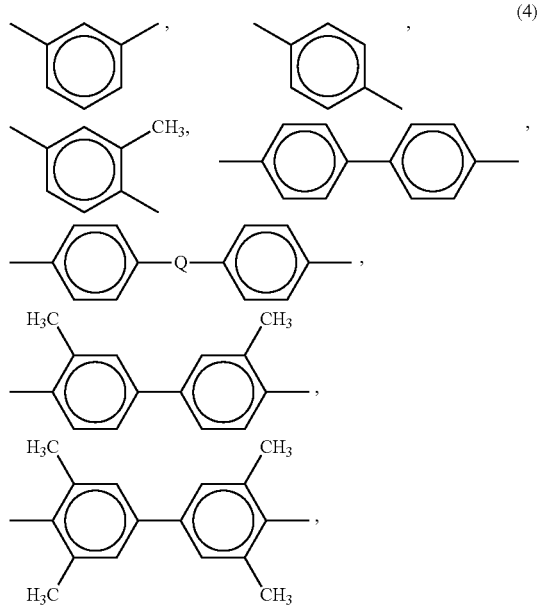
(4)

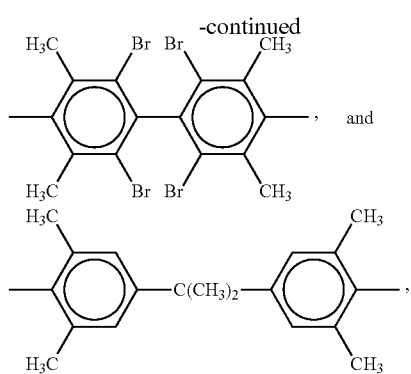
and wherein Q includes, but is not limited to a divalent moiety including —O—, —S—, —C(O), —SO$_2$—, —SO—, —C$_y$H$_{2y}$— (y being an integer from 1 to 5), and halogenated derivatives thereof, including perfluoroalkylene groups.

In an aspect, the PEI comprise more than 1, specifically 10 to 1,000, or more specifically, 10 to 500 structural units, of formula (5):

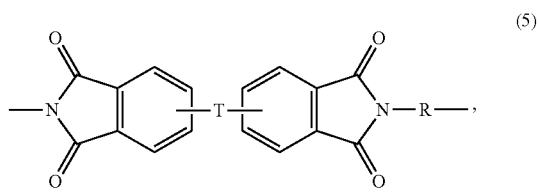
(5)

wherein T is —O— or a group of the formula —O—Z—O— wherein the divalent bonds of the —O— or the —O—Z—O— group are in the 3,3',3,4',4,3', or the 4,4' positions; Z is a divalent group of formula (3) as defined above; and R is a divalent group of formula (2) as defined above.

In another aspect, the polyetherimidesulfones are PEIs comprising ether groups and sulfone groups wherein at least 50 mole % of the linkers V and the groups R in formula (1) comprise a divalent arylenesulfone group. For example, all linkers V, but no groups R, can contain an arylenesulfone group; or all groups R but no linkers V can contain an arylenesulfone group; or an arylenesulfone can be present in some fraction of the linkers V and R groups, provided that the total mole fraction of V and R groups containing an aryl sulfone group is greater than or equal to 50 mole %.

Even more specifically, polyetherimidesulfones can comprise more than 1, specifically 10 to 1,000, or more specifically, 10 to 500 structural units of formula (6):

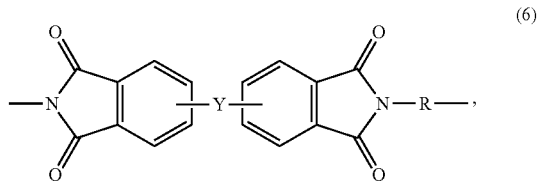
(6)

wherein Y is —O—, —SO2-, or a group of the formula —O—Z—O— wherein the divalent bonds of the —O—, SO2-, or the —O—Z—O— group are in the 3,3',3,4',4,3', or the 4,4' positions, wherein Z is a divalent group of formula (3) as defined above and R is a divalent group of formula (2) as defined above, provided that greater than 50 mole % of the sum of moles Y+moles R in formula (2) contain —SO2- groups.

It is to be understood that the PEIs and polyetherimidesulfones can optionally comprise linkers V that do not contain ether or ether and sulfone groups, for example linkers of formula (7):

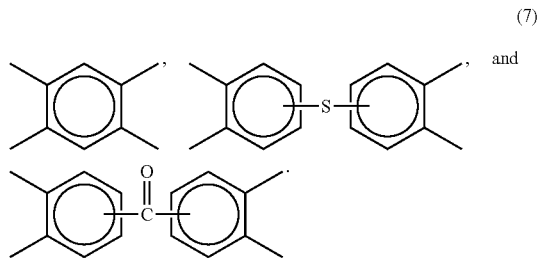

Imide units containing such linkers are generally be present in amounts ranging from 0 to 10 mole % of the total number of units, specifically 0 to 5 mole %. In one embodiment no additional linkers V are present in the PEIs and polyetherimidesulfones.

In another aspect, the PEI comprises 10 to 500 structural units of formula (5) and the polyetherimidesulfone contains 10 to 500 structural units of formula (6).

PEIs and polyetherimidesulfones can be prepared by any suitable process. In one embodiment, PEIs and PEI copolymers include polycondensation polymerization processes and halo-displacement polymerization processes.

Polycondensation methods can include a method for the preparation of PEIs having structure (1) is referred to as the nitro-displacement process (X is nitro in formula (8)). In one example of the nitro-displacement process, N-methyl phthalimide is nitrated with 99% nitric acid to yield a mixture of N-methyl-4-nitrophthalimide (4-NPI) and N-methyl-3-nitrophthalimide (3-NPI). After purification, the mixture, containing approximately 95 parts of 4-NPI and 5 parts of 3-NPI, is reacted in toluene with the disodium salt of bisphenol-A (BPA) in the presence of a phase transfer catalyst. This reaction yields BPA-bisimide and NaNO$_2$ in what is known as the nitro-displacement step. After purification, the BPA-bisimide is reacted with phthalic anhydride in an imide exchange reaction to afford BPA-dianhydride, which in turn is reacted with a diamine such as meta-phenylene diamine (MPD) in ortho-dichlorobenzene in an imidization-polymerization step to afford the product PEI.

Other diamines are also possible. Examples of suitable diamines include: m-phenylenediamine; p-phenylenediamine; 2,4-diaminotoluene; 2,6-diaminotoluene; m-xylylenediamine; p-xylylenediamine; benzidine; 3,3'-dimethylbenzidine; 3,3'-dimethoxybenzidine; 1,5-diaminonaphthalene; bis(4-aminophenyl)methane; bis(4-aminophenyl)propane; bis(4-aminophenyl)sulfide; bis(4-aminophenyl)sulfone; bis(4-aminophenyl)ether; 4,4'-diaminodiphenylpropane; 4,4'-diaminodiphenylmethane(4,4'-methylenedianiline); 4,4'-diaminodiphenylsulfide; 4,4'-diaminodiphenylsulfone; 4,4'-diaminodiphenylether(4,4'-oxydianiline); 1,5-diaminonaphthalene; 3,3'-dimethylbenzidine; 3-methylheptamethylenediamine; 4,4-dimethylheptamethylenediamine; 2,2',3,3'-tetrahydro-3,3,3',3'-tetramethyl-1,1'-spirobi[1H-indene]-6,6'-diamine; 3,3',4, 4'-tetrahydro-4,4,4',4'-tetramethyl-2,2'-spirobi[2H-1-benzopyran]-7,7'-diamine; 1,1'-bis[1-amino-2-methyl-4-phenyl] cyclohexane, and isomers thereof as well as mixtures and blends comprising at least one of the foregoing. In one embodiment, the diamines are specifically aromatic diamines, especially m- and p-phenylenediamine and mixtures comprising at least one of the foregoing.

Suitable dianhydrides that can be used with the diamines include and are not limited to 2,2-bis[4-(3,4-dicarboxyphenoxy)phenyl]propane dianhydride; 4,4'-bis(3,4-dicarboxyphenoxy)diphenyletherdianhydride; 4,4'-bis(3,4-dicarboxyphenoxy)diphenylsulfidedianhydride; 4,4'-bis(3,4-dicarboxyphenoxy)benzophenonedianhydride; 4,4'-bis(3,4-dicarboxyphenoxy)diphenylsulfonedianhydride; 2,2-bis[4-(2,3-dicarboxyphenoxy)phenyl]propane dianhydride; 4,4'-bis(2,3-dicarboxyphenoxy)diphenyletherdianhydride; 4,4'-bis(2,3-dicarboxyphenoxy)diphenylsulfidedianhydride; 4,4'-bis(2,3-dicarboxyphenoxy)benzophenonedianhydride; 4,4'-bis(2,3-dicarboxyphenoxy)diphenylsulfonedianhydride; 4-(2,3-dicarboxyphenoxy)-4'-(3,4-dicarboxyphenoxy) diphenyl-2,2-propane dianhydride; 4-(2,3-dicarboxyphenoxy)-4'-(3,4-dicarboxyphenoxy)diphenyletherdianhydride; 4-(2,3-dicarboxyphenoxy)-4'-(3,4-dicarboxyphenoxy) diphenylsulfide dianhydride; 4-(2,3-dicarboxyphenoxy)-4'-(3,4-dicarboxyphenoxy)benzophenonedianhydride; 4-(2,3-dicarboxyphenoxy)-4'-(3,4-dicarboxyphenoxy) diphenylsulfone dianhydride; 1,3-bis(2,3-dicarboxyphenoxy)benzene dianhydride; 1,4-bis(2,3-dicarboxyphenoxy)benzene dianhydride; 1,3-bis(3,4-dicarboxyphenoxy)benzene dianhydride; 1,4-bis(3,4-dicarboxyphenoxy)benzene dianhydride; 3,3',4,4'-diphenyl tetracarboxylicdianhydride; 3,3',4,4'-benzophenonetetracarboxylic dianhydride; naphthalicdianhydrides, such as 2,3,6,7-naphthalic dianhydride, etc.; 3,3',4,4'-biphenylsulphonictetracarboxylic dianhydride; 3,3',4,4'-biphenylethertetracarboxylic dianhydride; 3,3',4,4'-dimethyldiphenylsilanetetracarboxylic dianhydride; 4,4'-bis (3,4-dicarboxyphenoxy)diphenylsulfidedianhydride; 4,4'-bis (3,4-dicarboxyphenoxy)diphenylsulphonedianhydride; 4,4'-bis(3,4-dicarboxyphenoxy)diphenylpropanedianhydride; 3,3',4,4'-biphenyltetracarboxylic dianhydride; bis(phthalic) phenylsulphineoxidedianhydride; p-phenylene-bis(triphenylphthalic)dianhydride; m-phenylene-bis(triphenylphthalic)dianhydride; bis(triphenylphthalic)-4,4'-diphenylether dianhydride; bis(triphenylphthalic)-4,4'-diphenylmethane dianhydride; 2,2'-bis(3,4-dicarboxyphenyl)hexafluoropropanedianhydride; 4,4'-oxydiphthalic dianhydride; pyromelliticdianhydride; 3,3',4,4'-diphenylsulfonetetracarboxylic dianhydride; 4',4'-bisphenol A dianhydride; hydroquinone diphthalic dianhydride; 6,6'-bis(3,4-dicarboxyphenoxy)-2,2',3,3'-tetrahydro-3,3,3',3'-tetramethyl-1,1'-spirobi[1H-indene]dianhydride; 7,7'-bis(3,4-dicarboxyphenoxy)-3,3',4,4'-tetrahydro-4,4,4',4'-tetramethyl-1-2,2'-spirobi[2H-1-benzopyran] dianhydride; 1,1'-bis[1-(3,4-dicarboxyphenoxy)-2-methyl-4-phenyl]cyclohexane dianhydride; 3,3',4,4'-diphenylsulfonetetracarboxylic dianhydride; 3,3',4,4'-diphenylsulfidetetracarboxylic dianhydride; 3,3',4,4'-diphenylsulfoxidetetracarboxylic dianhydride; 4,4'-oxydiphthalic dianhydride; 3,4'-oxydiphthalic dianhydride; 3,3'-oxydiphthalic dianhydride; 3,3'-benzophenonetetracarboxylic dianhydride; 4,4'-carbonyldiphthalic dianhydride; 3,3',4,4'-diphenylmethanetetracarboxylic dianhydride; 2,2-bis(4-(3,3-dicarboxyphenyl)propane dianhydride; 2,2-bis(4-(3,3-dicarboxyphenyl)hexafluoropropanedianhydride; (3,3',4,4'-diphenyl)phenylphosphinetetracarboxylicdianhydride; (3,3',4,4'-diphenyl)phenylphosphineoxidetetracarboxylicdianhydride; 2,2'-dichloro-3,3',4,4'-biphenyltetracarboxylic dianhydride; 2,2'-dimethyl-3,3',4,4'-biphenyltetracarboxylic dianhydride; 2,2'-dicyano-3,3',4,4'-biphenyltetracarboxylic dianhydride; 2,2'-dibromo-3,3',4,4'-biphenyltetracarboxylic dianhydride; 2,2'-diiodo-3,3',4,4'-biphenyltetracarboxylic dianhydride; 2,2'-ditrifluoromethyl-3,3',4,4'-biphenyltetracarboxylic dianhydride; 2,2'-bis(1-methyl-4-phenyl)-3,3',4,4'-biphenyltetracarboxylic dianhydride; 2,2'-bis(1-trifluoromethyl-2-phenyl)-3,3',4,4'-biphenyltetracarboxylic dianhydride; 2,2'-bis(1-trifluoromethyl-3-phenyl)-3,3',4,4'-biphenyltetracarboxylic dianhydride; 2,2'-bis(1-trifluoromethyl-4-phenyl)-3,3',4,4'-biphenyltetracarboxylic dianhydride; 2,2'-bis(1-phenyl-4-phenyl)-3,3',4,4'-biphenyltetracarboxylic dianhydride; 4,4'-bisphenol A dianhydride; 3,4'-bisphenol A dianhydride; 3,3'-bisphenol A dianhydride; 3,3',4,4'-diphenylsulfoxidetetracarboxylic dianhydride; 4,4'-carbonyldiphthalic dianhydride; 3,3',4,4'-diphenylmethanetetracarboxylic dianhydride; 2,2'-bis(1,3-trifluoromethyl-4-phenyl)-3,3',4,4'-biphenyltetracarboxylic dianhydride, and all isomers thereof, as well as combinations of the foregoing.

Halo-displacement polymerization methods for making PEIs and polyetherimidesulfones include and are not limited to, the reaction of a bis(phthalimide) for formula (8):

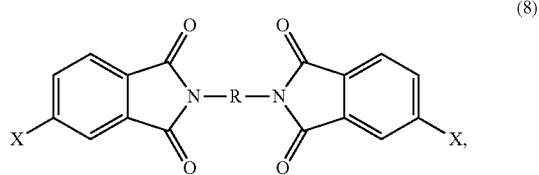

(8)

wherein R is as described above and X is a nitro group or a halogen. Bis-phthalimides (8) can be formed, for example, by the condensation of the corresponding anhydride of formula (9):

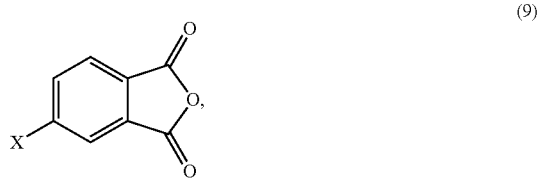

(9)

wherein X is a nitro group or halogen, with an organic diamine of the formula (10):

$H_2N-R-NH_2$ (10), wherein R is as described above.

Illustrative examples of amine compounds of formula (10) include: ethylenediamine, propylenediamine, trimethylenediamine, diethylenetriamine, triethylenetetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis(3-aminopropyl)amine, 3-methoxyhexamethylenediamine, 1,2-bis(3-aminopropoxy)ethane, bis(3-aminopropyl)sulfide, 1,4-cyclohexanediamine, bis-(4-aminocyclohexyl)methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl)methane, bis(2-chloro-4-amino-3,5-diethylphenyl)methane, bis(4-aminophenyl)propane, 2,4-bis(b-amino-t-butyl)toluene, bis(p-b-amino-t-butylphenyl)ether, bis(p-b-methyl-o-aminophenyl)benzene, bis(p-b-methyl-o-aminopentyl)benzene, 1,3-diamino-4-isopropylbenzene, bis(4-aminophenyl)ether and 1,3-bis(3-aminopropyl)tetramethyldisiloxane. Mixtures of these amines can be used. Illustrative examples of amine compounds of formula (10) containing sulfone groups include but are not limited to, diaminodiphenylsulfone and bis(aminophenoxy phenyl)sulfones. Combinations comprising any of the foregoing amines can be used.

The PEIs can be synthesized by the reaction of the bis (phthalimide) (8) with an alkali metal salt of a dihydroxy substituted aromatic hydrocarbon of the formula HO-V-OH wherein V is as described above, in the presence or absence of phase transfer catalyst. Suitable phase transfer catalysts are disclosed in U.S. Pat. No. 5,229,482, which is incorporated herein by reference in its entirety. Specifically, the dihydroxy substituted aromatic hydrocarbon a bisphenol such as bisphenol A, or a combination of an alkali metal salt of a bisphenol and an alkali metal salt of another dihydroxy substituted aromatic hydrocarbon can be used.

In one embodiment, the PEI comprises structural units of formula (5) wherein each R is independently p-phenylene or m-phenylene or a mixture comprising at least one of the foregoing; and T is group of the formula —O—Z—O— wherein the divalent bonds of the —O—Z—O— group are in the 3,3' positions, and Z is 2,2-diphenylenepropane group (a BPA group). Further, the polyetherimidesulfone comprises structural units of formula (6) wherein at least 50 mole % of the R groups are of formula (4) wherein Q is —SO$_2$— and the remaining R groups are independently p-phenylene or m-phenylene or a combination comprising at least one of the foregoing; and T is group of the formula —O—Z—O— wherein the divalent bonds of the —O—Z—O— group are in the 3,3' positions, and Z is a 2,2-diphenylenepropane group.

The PEI and polyetherimidesulfone can be used alone or in combination with each other and/or other of the disclosed polymeric materials in fabricating the polymeric components of the invention. In one embodiment, only the PEI is used. In another embodiment, the weight ratio of PEI to polyetherimidesulfone can be from 99:1 to 50:50.

The PEIs can have a weight average molecular weight (Mw) of 5,000 to 100,000 grams per mole (g/mole) as measured by gel permeation chromatography. In some embodiments the Mw can be 10,000 to 80,000. Mw, as used herein, refers to the absolute Mw.

The PEIs can have an intrinsic viscosity greater than or equal to 0.2 deciliters per gram (dl/g) as measured in m-cresol at 25° C. Within this range the intrinsic viscosity can be 0.35 to 1.0 dl/g, as measured in m-cresol at 25° C.

The PEIs can have a glass transition temperature of greater than 180° C., specifically of 200° C. to 500° C., as measured using differential scanning calorimetry per ASTM test D3418. In some embodiments, the PEI and, in particular, a PEI has a glass transition temperature of 240° C. to 350° C.

The PEIs can have a melt index of 0.1 to 10 grams per minute, as measured by ASTM D1238 at 340° C. to 370° C., using a 6.7 kilogram (kg) weight.

An alternative halo-displacement polymerization process for making PEIs, e.g., PEIs having structure (1) is a process referred to as the chloro-displacement process (X is Cl in formula (8)). The chloro-displacement process is described as follows: 4-chloro phthalic anhydride and MPD are reacted in the presence of a catalytic amount of sodium phenyl phosphinate catalyst to produce the bischlorophthalimide of MPD (CAS No. 148935-94-8). The bischlorophthalimide is then subjected to polymerization by chloro-displacement reaction with the disodium salt of BPA in the presence of a catalyst in ortho-dichlorobenzene or anisole solvent. Alternatively, mixtures of 3-chloro- and 4-chlorophthalic anhydride may be employed to provide a mixture of isomeric bischlorophthalimides which may be polymerized by chloro-displacement with BPA disodium salt as described above.

Siloxane PEIs can include polysiloxane/PEI block copolymers having a siloxane content of greater than 0 and less than about 40 weight percent (wt %) based on the total weight of the block copolymer. The block copolymer comprises a siloxane block of Formula (11):

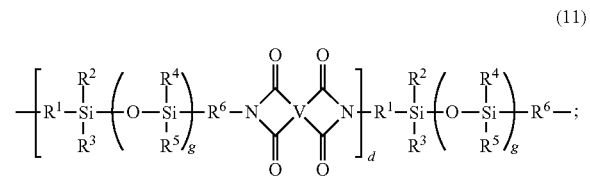

(11)

wherein $R^{1-6}$ are independently at each occurrence selected from the group consisting of substituted or unsubstituted, saturated, unsaturated, or aromatic monocyclic groups having 5 to 30 carbon atoms; substituted or unsubstituted, saturated, unsaturated, or aromatic polycyclic groups having 5 to 30 carbon atoms; substituted or unsubstituted alkyl groups having 1 to 30 carbon atoms; and substituted or unsubstituted alkenyl groups having 2 to 30 carbon atoms. V is a tetravalent linker selected from the group consisting of substituted or unsubstituted, saturated, unsaturated, or aromatic monocyclic and polycyclic groups having 5 to 50 carbon atoms; substituted or unsubstituted alkyl groups having 1 to 30 carbon atoms; substituted or unsubstituted alkenyl groups having 2 to 30 carbon atoms; and combinations comprising at least one of the foregoing linkers. g is any number including and between 1 to 30 and d is any number including and between 2 to 20. Commercially available siloxane PEIs can be obtained from SABIC Innovative Plastics under the brand name SILTEM* (*Trademark of SABIC Innovative Plastics IP B.V.)

The PEI resin can have a Mw within a range having a lower limit and/or an upper limit. The range can include or exclude the lower limit and/or the upper limit. The lower limit and/or upper limit can be selected from 5000, 6000, 7000, 8000, 9000, 10000, 11000, 12000, 13000, 14000, 15000, 16000, 17000, 18000, 19000, 20000, 21000, 22000, 23000, 24000, 25000, 26000, 27000, 28000, 29000, 30000, 31000, 32000, 33000, 34000, 35000, 36000, 37000, 38000, 39000, 40000, 41000, 42000, 43000, 44000, 45000, 46000, 47000, 48000, 49000, 50000, 51000, 52000, 53000, 54000, 55000, 56000, 57000, 58000, 59000, 60000, 61000, 62000, 63000, 64000, 65000, 66000, 67000, 68000, 69000, 70000, 71000, 72000, 73000, 74000, 75000, 76000, 77000, 78000, 79000, 80000, 81000, 82000, 83000, 84000, 85000, 86000, 87000, 88000, 89000, 90000, 91000, 92000, 93000, 94000, 95000, 96000, 97000, 98000, 99000, 100000, 101000, 102000, 103000, 104000, 105000, 106000, 107000, 108000, 109000, and 110000 Daltons. For example, the PEI resin can have a Mw from 5,000 to 100,000 Daltons, from 5,000 to 80,000 Daltons, or from 5,000 to 70,000 Daltons. The primary alkyl amine modified PEI will have lower Mw and higher melt flow than the starting, unmodified, PEI.

In a further aspect, the PEI has a structure represented by a formula:

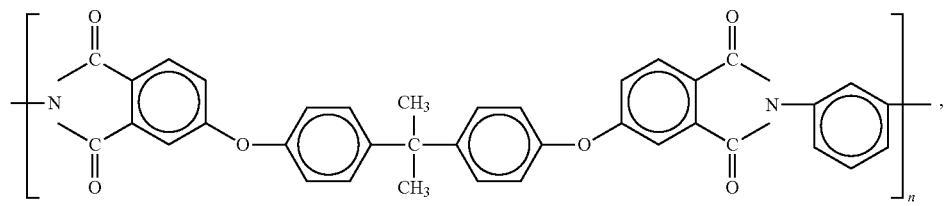

wherein the PEI polymer has a Mw of at least 20,000 Daltons, 30,000 Daltons, 40,000 Daltons, 50,000 Daltons, 60,000 Daltons, 80,000 Daltons, or 100,000 Daltons.

In one aspect, the PEI comprises

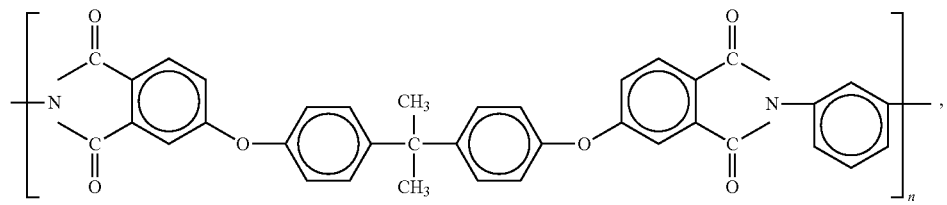

wherein n is greater than 1, for example greater than 10. In one aspect n is between 2-100, 2-75, 2-50, or 2-25, for example 10-100, 10-75, 10-50, or 10-25. In another example, n can be 38, 56, or 65.

The PEI resin can be selected from the group consisting of a PEI, for example, as described in U.S. Pat. Nos. 3,875,116; 6,919,422; and 6,355,723; a silicone PEI, for example as described in U.S. Pat. Nos. 4,690,997 and 4,808,686 and a polyetherimidesulfone resin, as described in U.S. Pat. No. 7,041,773 and combinations thereof, each of these patents are incorporated herein their entirety.

The PEI resin can have a glass transition temperature within a range having a lower limit and/or an upper limit. The range can include or exclude the lower limit and/or the upper limit. The lower limit and/or upper limit can be selected from 100, 110, 120, 130, 140, 150, 160, 170, 180, 190, 200, 210, 220, 230, 240, 250, 260, 270, 280, 290, 300, and 310 degrees Celsius. For example, the PEI resin can have a glass transition temperature greater than about 200 degrees Celsius.

The PEI resin can be substantially free (less than 100 ppm) of benzylic protons. The PEI resin can be free of benzylic protons. The PEI resin can have an amount of benzylic protons below 100 ppm. In one embodiment, the amount of benzylic protons ranges from more than 0 to below 100 ppm. In another embodiment, the amount of benzylic protons is not detectable.

The PEI resin can be substantially free (less than 100 ppm) of halogen atoms. The PEI resin can be free of halogen atoms. The PEI resin can have an amount of halogen atoms below 100 ppm. In one embodiment, the amount of halogen atoms range from more than 0 to below 100 ppm. In another embodiment, the amount of halogen atoms is not detectable.

Suitable PEIs that can be used in the disclosed composites include, but are not limited to, ULTEM PEIs. In a further aspect, the ULTEM PEI is ULTEM 1000. In one aspect, a PEI can comprise any polycarbonate material or mixture of materials, for example, as recited in U.S. Pat. Nos. 4,548,997; 4,629,759; 4,816,527; 6,310,145; and 7,230,066, all of which are hereby incorporated in its entirety for the specific purpose of disclosing various PEI compositions and methods.

3. Polyetheretherketone

In one aspect, the composition comprises PEEK. PEEK includes PEEK co-polymers. In one aspect, the composition comprises PEEK homopolymer.

In one aspect, the PEEK comprises repeat units of $$-O-\phi-[O-\phi]_{t1}-CO-\phi-[O-\phi]_{w1}-[CO-\phi]_{v1}-$$

Wherein t1 is 0 or 1, w1 is 0 or 1, and v1 is 0, 1, or 2. In one aspect, t1 is 1, v1 is 0, and w1 is 0. In another aspect, t1 is 0, v1 is 0, and w1 is 0. In yet another aspect, t1 is 0, w1 is 1, and v1 is 2. In yet another aspect, t1 is 0, v1 is 1, and w1 is 0. In yet another aspect, t1 is 1, v1 is 0, and w1 is 0.

In one aspect, the PEEK can comprise a moiety of formula

I $$-(E-Ar-(\phi)_m-E')-$$

and/or a moiety of formula

II $$-(\phi-CO-(\phi)_w-G-[(\phi)_r]-CO-\phi)_s-$$

and/or a moiety of formula

III $$-(\phi-SO_2-(\phi)_z-G-[(\phi)_t]-SO_2-\phi)_y-$$

wherein m, r, s, t, v, w, and z independently represent zero or a positive integer, E and E' independently represent an oxygen or a sulfur atom or a direct link, G represents an oxygen or sulfur atom, a direct link or a —O—Ph-0- moiety where Ph represents a phenyl group and Ar is selected from one of the following moieties (i), (i) to (iv) which is bonded via one or more of its phenyl moieties to adjacent moieties (i)

$$\phi-C(CH_3)_2-\phi$$

(i)

$$\phi-CO$$

(ii)

$$\phi-C$$

-continued (iii)

$$\phi-O-\phi-O-\phi$$

(iv)

$$\phi$$

In one aspect, a phenyl moiety has 1,4-, linkages to moieties to which it is bonded.

In one aspect, (i), the middle phenyl may be 1,4- or 1,3- substituted, for example 1, 4-substituted.

In one aspect, the PEEK can have a main peak of endotherm of at least 300° C.

In one aspect, the PEEK can have a Mw within a range having a lower limit and/or an upper limit. The range can include or exclude the lower limit and/or the upper limit. The lower limit and/or upper limit can be selected from 5000, 6000, 7000, 8000, 9000, 10000, 11000, 12000, 13000, 14000, 15000, 16000, 17000, 18000, 19000, 20000, 21000, 22000, 23000, 24000, 25000, 26000, 27000, 28000, 29000, 30000, 31000, 32000, 33000, 34000, 35000, 36000, 37000, 38000, 39000, 40000, 41000, 42000, 43000, 44000, 45000, 46000, 47000, 48000, 49000, 50000, 51000, 52000, 53000, 54000, 55000, 56000, 57000, 58000, 59000, 60000, 61000, 62000, 63000, 64000, 65000, 66000, 67000, 68000, 69000, 70000, 71000, 72000, 73000, 74000, 75000, 76000, 77000, 78000, 79000, 80000, 81000, 82000, 83000, 84000, 85000, 86000, 87000, 88000, 89000, 90000, 91000, 92000, 93000, 94000, 95000, 96000, 97000, 98000, 99000, 100000, 101000, 102000, 103000, 104000, 105000, 106000, 107000, 108000, 109000, and 110000 Daltons. For example, the PEI resin can have a Mw from 5,000 to 100,000 Daltons, from 5,000 to 80,000 Daltons, or from 5,000 to 70,000 Daltons. The primary alkyl amine modified PEI will have lower Mw and higher melt flow than the starting, unmodified, PEI.

4. Polyamides

In one aspect, the polymer can be one or more polyamides. Polyamides are generally derived from the polymerization of organic lactams having from 4 to 12 carbon atoms. In one aspect, the lactam can have the formula

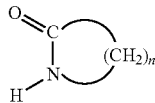

wherein n is about 3 to about 11. In one aspect, the lactam is epsilon-caprolactam having n equal to 5.

Polyamides can also be synthesized from amino acids having from 4 to 12 carbon atoms. In one aspect, the amino acids have the formula

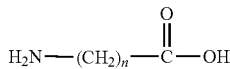

wherein n is about 3 to about 11. In one aspect, the amino acid is epsilon-aminocaproic acid with n equal to 5.

Polyamides can also be polymerized from aliphatic dicarboxylic acids having from 4 to 12 carbon atoms and aliphatic diamines having from 2 to 12 carbon atoms. In one aspect, the aliphatic diamines can have the formula

wherein n is about 2 to about 12. In one aspect, the aliphatic diamine is hexamethylenediamine ($H_2N(CH_2)_6NH_2$). The molar ratio of the dicarboxylic acid to the diamine can be about 0.66 to about 1.5. Within this range the molar ratio can be greater than or equal to about 0.81, or equal to about 0.96. In one aspect, this range is an amount of less than or equal to about 1.22, for example, less than or equal to about 1.04. In one aspect, the polyamides are nylon 6, nylon 6,6, nylon 4,6, nylon 6, 12, nylon 10, or the like, or combinations including at least one of the foregoing nylons. In another aspect, the polyamide can be nylon 6. In another aspect, the polyamide can be nylon 6,6. Nylon 6 and nylon 6,6 are also commonly known as PA6 and PA66 respectively.

5. Polyalkylene Terephthalate

In one aspect, the polymer can be a polyalkylene terephthalate. In one aspect, the polyalkylene terephthalate can be selected form polyethylene terephthalate, polybutylene terephthalate (PBT), polyethylene naphthalate, polybutylene naphthalate, and poly1,3-propylene terephthalate. In one aspect, the polyalkylene terephthalate can be polybutylene terephthalate. Other suitable polyalkylene terephthalates include poly(1,4-cyclohexylenedimethylene terephthalate), poly(1,4-cyclohexylenedimethylene cyclohexane-1,4-dicarboxylate) also known as poly(cyclohexane-14-dimethanol cyclohexane-1,4-dicarboxylate), and poly(1,4-cyclohexylenedimethylene terephthalate-co-isophthalate).

In one aspect, the polyalkylene terephthalate can have a Mw of less than about 10,000 Daltons. In another aspect, the polyalkylene terephthalate can have a Mw of less than about 20,000 Daltons. In yet another aspect, the polyalkylene terephthalate can have a Mw of less than about 30,000 Daltons.

In one aspect, the polyalkylene terephthalate can have a Mw from about 1,000 Daltons to about 100,000 Daltons.

6. Polyoxyalkylene

In one aspect, the polymer can be polyoxyalkylene. In one aspect, the polyoxyalkylene can be polyoxymethylene. In another aspect, the polyoxyalkylene can be polyoxyethylene.

In one aspect, the polyoxyalkylene can have a Mw of less than about 10,000 Daltons. In another aspect, the polyoxyalkylene can have a Mw of less than about 20,000 Daltons. In yet another aspect, the polyoxyalkylene can have a Mw of less than about 30,000 Daltons.

In one aspect, the polyoxyalkylene can have a Mw from about 1,000 Daltons to about 100,000 Daltons.

7. Reinforcement Agent

In one aspect, the composition can comprise a reinforcement agent. The reinforcement agent can be fibrous or a non-fibrous. In one aspect, the reinforcement agent can be fibrous. In another aspect, the reinforcement agent can be fibrous and non-fibrous. The reinforcement agent can comprise inorganic fibrous materials, non-melting and high-melting organic fibrous materials. Reinforcement agents include, but are not limited to glass fiber, carbon fiber, asbestos fiber, silica fiber, alumina fiber, zirconia fiber, boron nitride fiber, silicon nitride fiber, boron fiber, fluorocarbon resin fiber and potassium titanate fiber. In one aspect, the reinforcement agent comprises carbon fiber. In one aspect, the reinforcement agent comprises glass fiber C. Articles Also disclosed herein is an article comprising one or more compositions described herein. In one aspect, the article is selected from the group consisting of electric equipment, electronic equipment, office equipment, automobile equipment, industrial equipment. In one aspect, the articles can be used as sliding parts. Such articles include, but are not limited to, bearings, gears, cams, rollers, sliding plates, pulleys, levers and guides. In one aspect, the articles can be a bearing. In yet another aspect, the article can be a gear. In yet another aspect, the article can be a cam. In yet another aspect, the article can be a roller. In yet another aspect, the article can be a sliding pate. In yet another aspect, the article can be a pulley. In yet another aspect, the article can be a lever. In yet another aspect, the article can be a guide.

D. Aspects

The disclosed methods include at least the following aspects.

Aspect 1: A composition comprising: (a) from about 30% by weight to about 97% by weight of polymer, wherein the polymer comprises polyetherimide, polyetheretherketone, polyamide, polyoxyalkylene, or polyalkylene terephthalate, or a mixture thereof; and (b) from about 3% by weight to about 30% by weight ultra-high molecular weight polyethylene, wherein the ultra-high molecular weight polyethylene comprises above 0% by weight to about 10% by weight of a surface modifier.

Aspect 2: The composition of aspect 1, wherein the composition further comprises from above 0% by weight to about 60% by weight reinforcement agent.

Aspect 3: The composition of aspect 1, wherein the composition further comprises from about 10% by weight to about 60% by weight reinforcement agent.

Aspect 4: The composition of aspect 2, wherein the reinforcement agent comprises carbon fiber or glass fiber or a combination thereof.

Aspect 5: The composition of aspect 3, wherein the reinforcement agent comprises carbon fiber or glass fiber or a combination thereof.

Aspect 6: The composition of any one of aspects 1-5, wherein the surface modifier comprises a halogen.

Aspect 7: The composition of aspect 6, wherein the halogen is fluorine or chlorine.

Aspect 8: The composition of any one of aspects 1-7, wherein the surface modifier comprises a carboxyl, hydroxyl, or carbonyl moiety, or a combination thereof.

Aspect 9: The composition of any one of aspects 1-8, wherein the ultra-high molecular weight polyethylene comprises from about 0.01% by weight to 0.5% by weight of the surface modifier.

Aspect 10: The composition of any one of aspects 1-9, wherein the polymer is polyetherimide.

Aspect 11: The composition of any one of aspects 1-9, wherein the polymer is polyetheretherketone.

Aspect 12: The composition of any one of aspects 1-9, wherein the polymer is a polyamide.

Aspect 13: The composition of any one of aspects 1-9, wherein the polymer is a polyalkylene terephthalate.

Aspect 14: The composition of any one of aspects 1-9, wherein the polymer is a polyoxyalkylene.

Aspect 15: The composition of any one of aspects 1-14, wherein the ultra-high molecular weight polyethylene are discrete particles in the composition.

Aspect 16: The composition of any one of aspects 1-15, wherein the composition comprises from about 10% by weight to about 20% by weight ultra-high molecular weight polyethylene.

Aspect 17: The composition of any one of aspects 1-16, wherein the composition comprises from about 10% by weight to about 60% by weight reinforcement agent, from about 10% by weight to about 20% by weight ultra-high molecular weight polyethylene, and from about 30% by weight to about 80% by weight of the polymer comprising polyetherimide, polyetheretherketone, polyamide, polyoxyalkylene, or polyalkylene terephthalate, or a mixture thereof.

Aspect 18: The composition of any one of aspects 1-17, wherein the composition has a wear factor of less than about 50 as determined by a test according to ASTM D3702 at about 120 psi and about 100 ft/min.

Aspect 19: An article comprising the composition of any one of aspects 1-18.

Aspect 20: The article of aspect 20, wherein in the article is one or more of a bearing, a gear, a cam, a roller, a sliding plate, a pulley, a lever, and a guide.

E. Examples

The following examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

1. Example 1 a. Materials and Methods

Wear properties of UHMWPE filled PEI and PEEK compositions were compared to unfilled and PTFE filled compositions to judge their value proposition. ULTEM PEI resin and PEEK resin from Victrex were used in the following examples. The chemical structures of repeat units of PEI and PEEK are shown in Scheme 2a and 2b, respectively. PTFE was obtained from Dupont and CFs were obtained from Grafil Inc., USA.

Scheme 2a and 2b

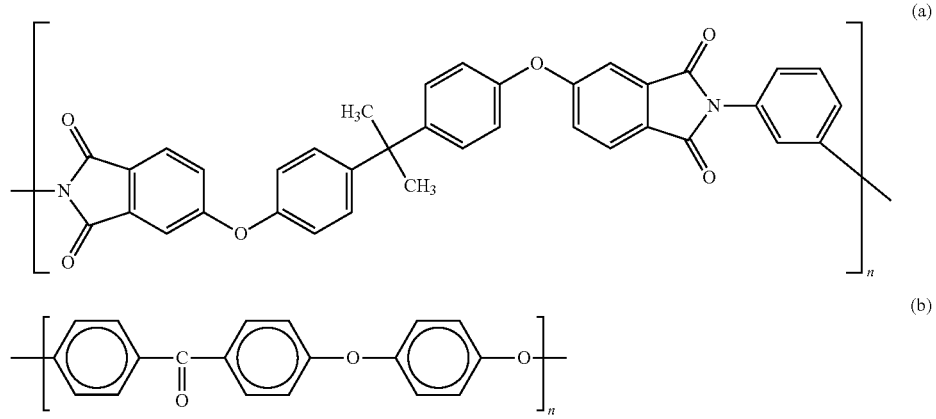

UHMWPE was procured from Mitsui Chemicals, Japan; INHANCE Products, USA; and Ticona, USA. The trade names of these commercially procured UHMWPE resins are mentioned in Table 1.

TABLE 1

| Grade of UHMWPE | Source | Information from Supplier on Surface Treatment |
| --- | --- | --- |
| MIPELON XM220 | Mitsui Chemicals | No treatment |
| MIPELON XM 221U | Mitsui Chemicals | No treatment |
| MIPELON PM 200 | Mitsui Chemicals | No treatment |
| GUR X162 | Ticona | No treatment |
| GUR 2126 | Ticona | No treatment |
| INHANCE 1750 | INHANCE Products | Surface treated |
| INHANCE 1250 | INHANCE Products | Surface treated |

Cold rolled carbon steel 1018 washers machined to a 16+/−2 micro-inch surface finish from Lewis Research, Delaware were used as the mating counter-face. The desired compositions containing lubricants and reinforcing fillers were compounded using a 25 mm Werner and Pfleider co-rotating twin-screw extruder. The test part, i.e., thrust washer samples having one-inch diameter, were molded using a 45-ton Engel injection-molding machine.

b. Sliding Wear Test

In this study, the sliding wear tests were conducted according to ASTM D3702 wherein the wear behavior of thermoplastic disc (with a wear ridge) against a steel washer (mating surface) is measured. Wear test was done in Tribometer following ASTM D3702, where the polymer surface is rotated against a stationary metal counter face as shown in FIG. 1.

Wear factor K represents the wear behavior of polymer composites in which polymer slides against a steel counterface. This parameter is derived from the Archard's equation (1) in which wear w (amount of the material lost) is proportional to the KF K, pressure P and velocity V $$w = KPV \quad (1)$$

Another form of the equation:

$$w = x/t \quad (2)$$

Therefore, wear rate is related to pressure and velocity:

$$x/t = KPV \quad (3)$$

Where, x is the thickness worn in inches, t is wear time in hours, P in psi, V in ft/min and K is in $inch^3 \cdot min./ft \cdot lb \cdot hr$) although K is a constant, it varies with different pressure and velocities.

The PV multiplier represents the work done per unit area per unit time at the contact surface. A part of the work is transformed into heat as follows:

$$\text{Heat generation} = PV \times f \quad (4)$$

Where, f is the CoF.

CoF also varies with the polymer type, mating surface, and the PV multiplier. The heat generation gives rise to the frictional heating and is measured as frictional temperature. The tests were conducted using a Lewis tribometer (Lewis Research USA). The applied pressure (P) and rotating speeds (V) were varied to obtain different PV conditions as shown in Table 2. The sliding distance for all the samples was maintained at 46 km. Different pressure and velocity conditions were employed to study its effect on the tribo-characteristics of UHMWPE based composites.

TABLE 2

PRESSURE AND VELOCITY CONDITION FOR THE WEAR TEST

| PV Conditions | P (pounds per square inch) | V (feet per minute) | T (minutes) |
| --- | --- | --- | --- |
| 2,000 | 40 | 50 | 3000 |
| 12,000 | 120 | 100 | 1498 | c. Image Analysis of UHMWPE Particles

Particle size was analyzed using Malvern Mastersizer 2000 particle size analyzer. A sample of dry UHMWPE powder is measured with a low angle laser beam and particle size distribution (PSD) is calculated. Particle morphology of UHMWPE particles were studied using a FEI Quanta TM 400 Environmental Scanning Electron Microscope. SEM analysis was also used to determine counter surface topography.

The chemical natures of the wear tracks produced by the polymer composites on the surfaces of the steel counter faces during sliding were analyzed using Energy Dispersive X-ray (EDX) analysis. EDX analysis was carried out in a PHI Quantum-2000 Scanning ESCA Microprobe surface analysis system.

d. Chemical Composition of Surface Treated UHMWPE Particles

To detect the chemical compositions of the collected wear particles, the microscopic Fourier transform infrared spectroscopy technique was applied. UHMWPE particles were mixed with KBr powders to form a sample. This sample was then analyzed by DRIFT FTIR in a transmission mode.

e. Results (1) DRIFT-FTIR Analysis of Surface Treated UHMWPE Particle

Figure 4A:
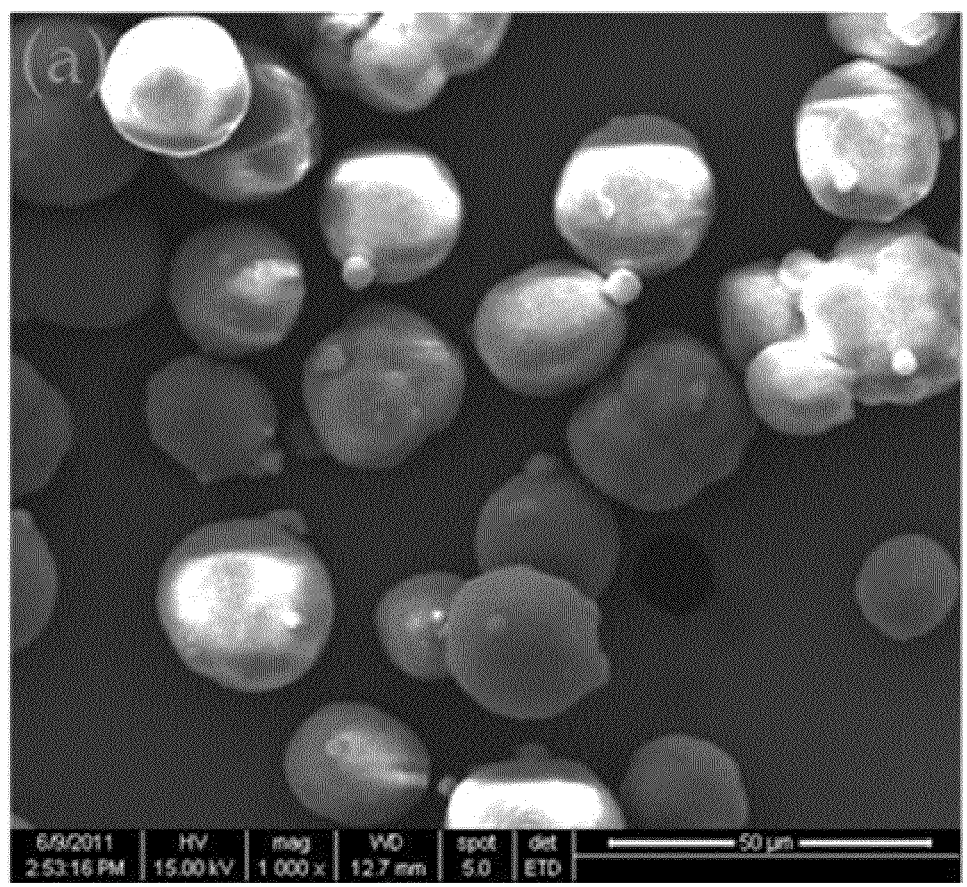
FIGS. 4A and 4B show SEM micrographs of 4A) Neat MIPELON XM 221U and 4B) Neat MIPELON PM 200.
Figure 4B:
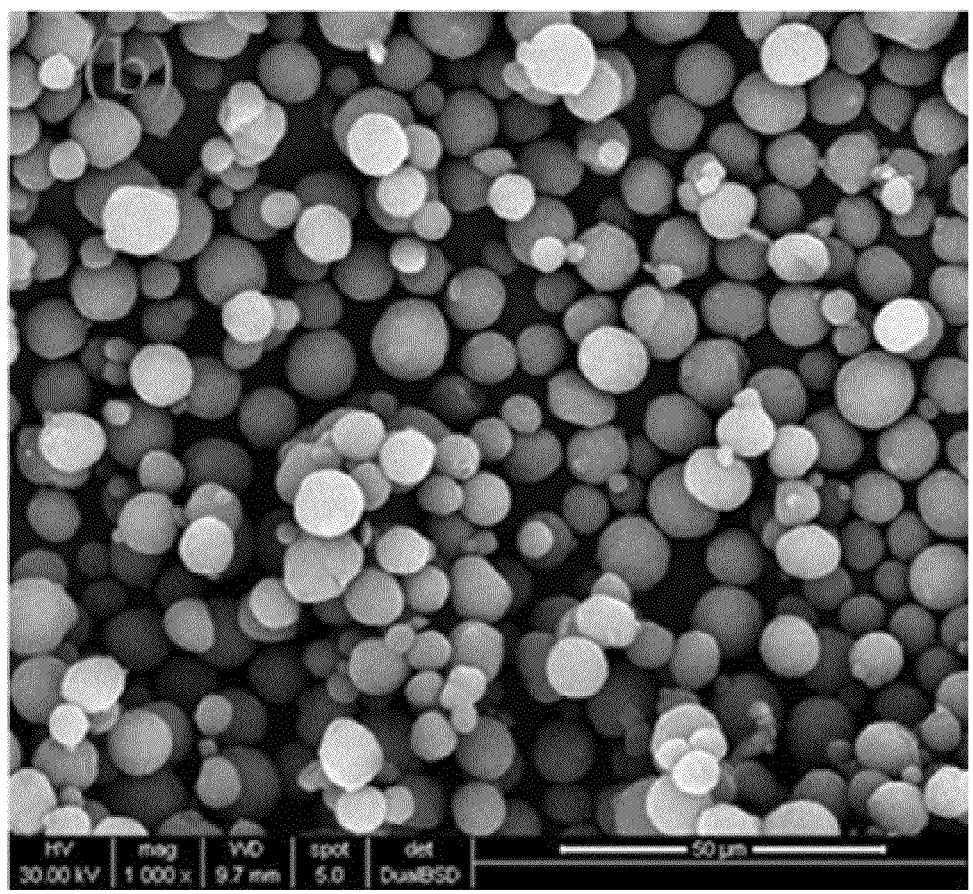
Figure 5A:
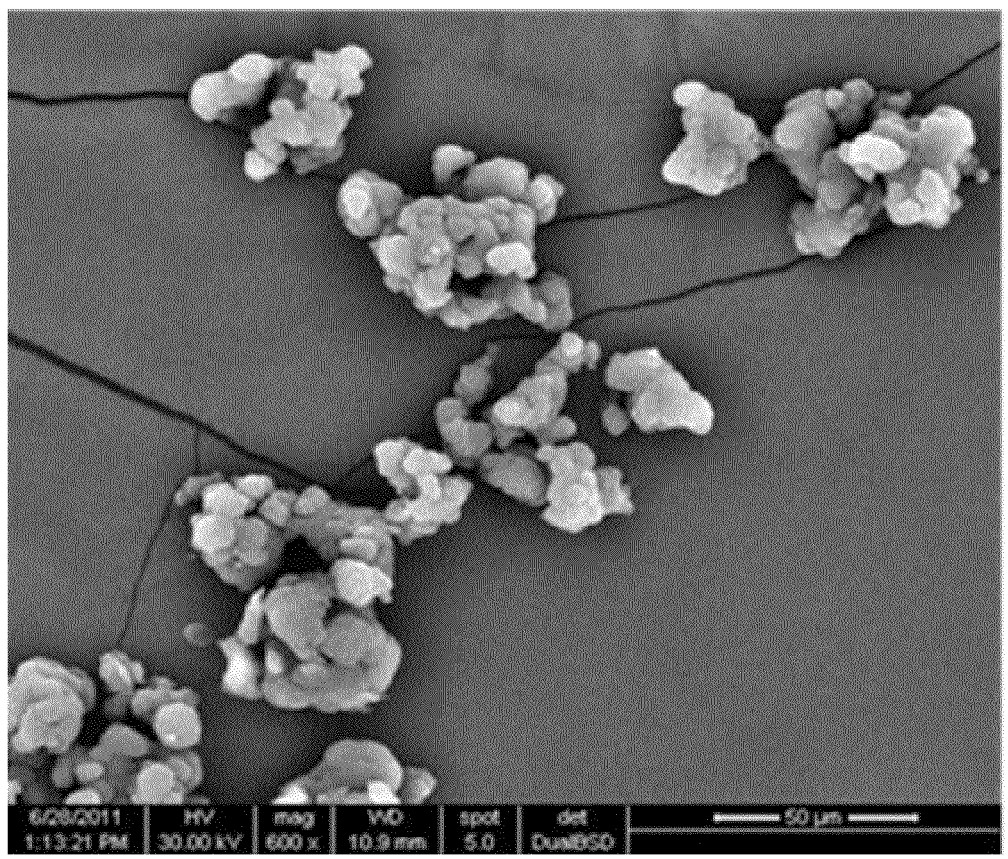
FIGS. 5A and 5B show SEM micrographs of 5A) Neat GUR2126 and 5B) Neat GURX162.
Figure 5B:
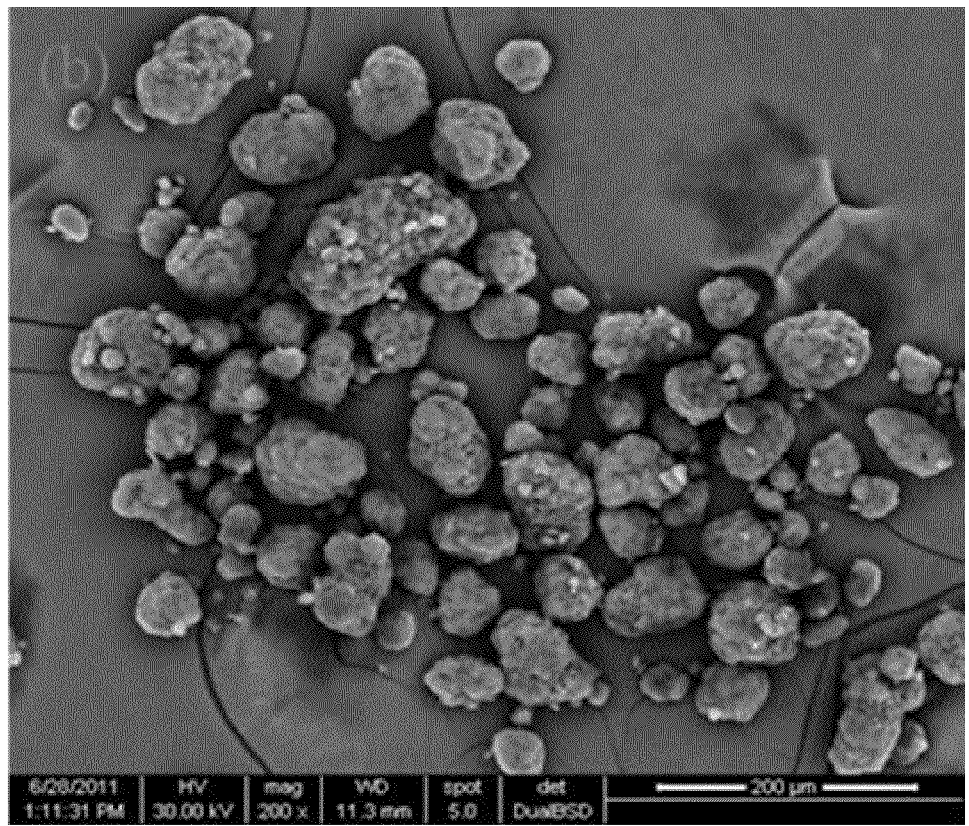
Figure 6A:
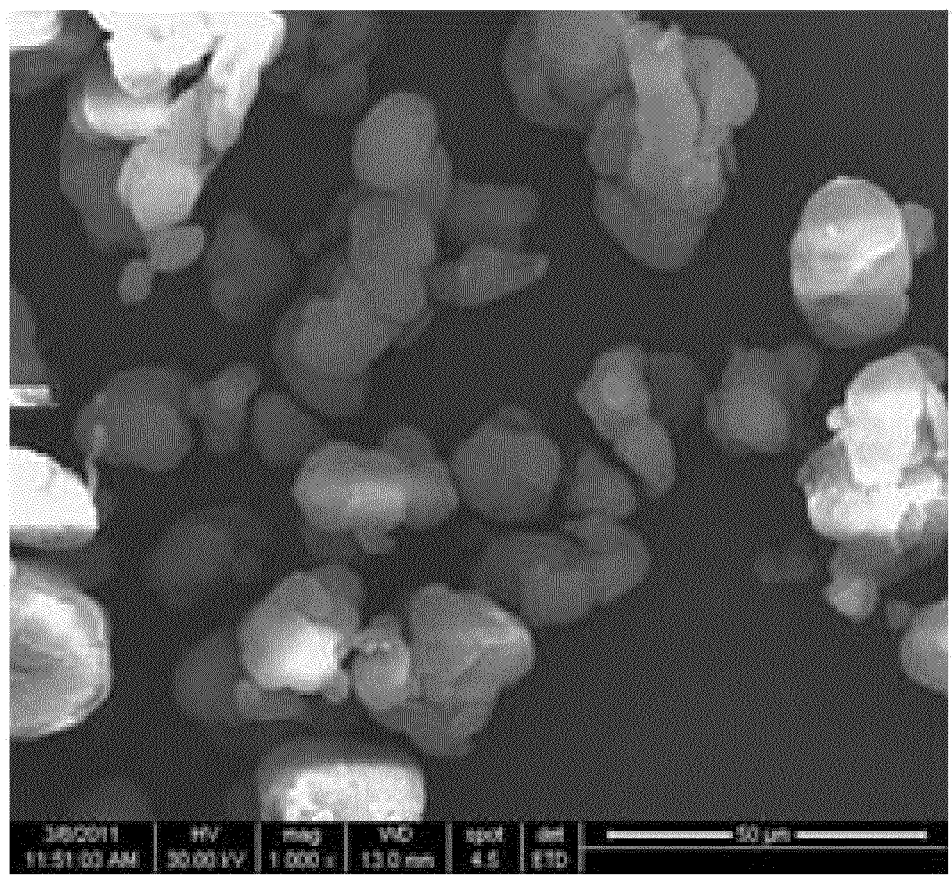
FIGS. 6A and 6B show SEM micrographs of 6A) INHANCE 1750 and 6B) INHANCE 1250.
Figure 6B:
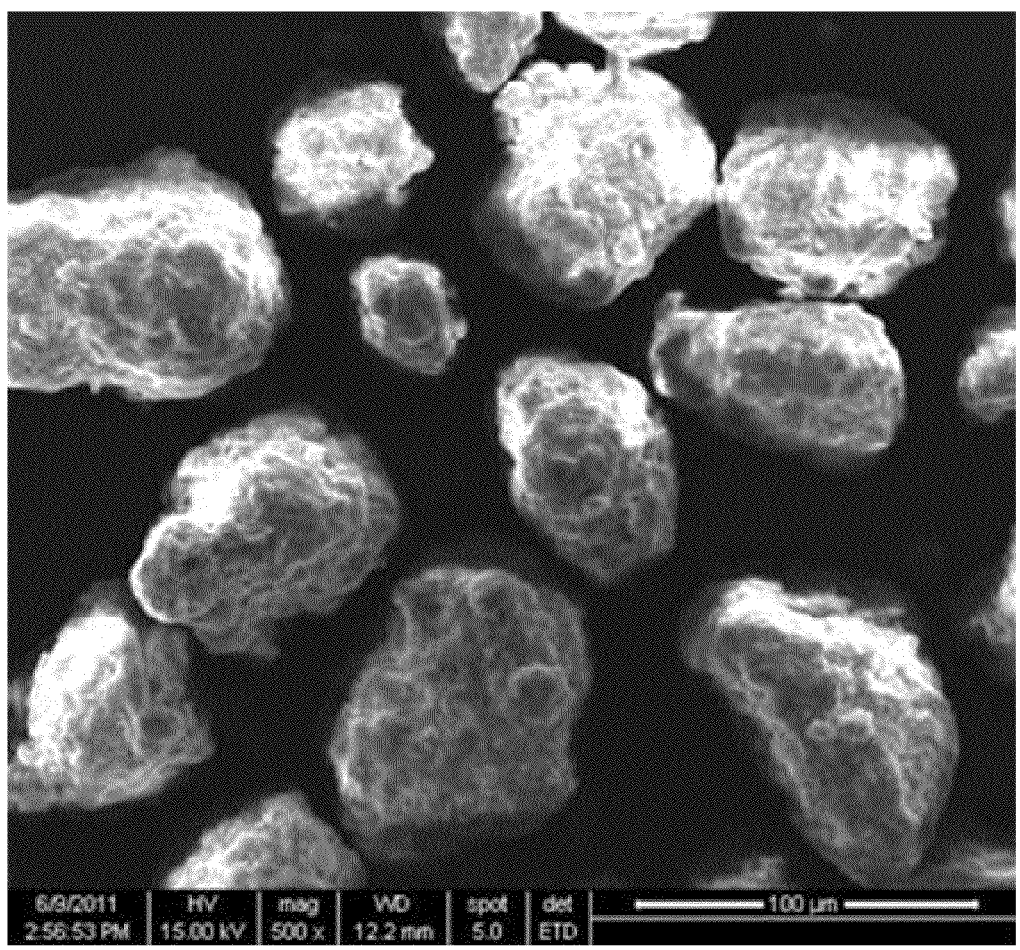

DRIFT-FTIR analysis was conducted for INHANCE samples since they had surface treatment to determine the type of treatment and compared against MIPELON XM 220, which does not have any surface treatment. The IR absorbance spectra are compared in FIG. 4. The peaks in the spectra represent the methyl groups (C—H stretching in (2800-3100) $cm^{-1}$, $CH_2$ scissors near 1460 $cm^{-1}$, and $CH_2$ rocking at 730 $cm^{-1}$) that are the characteristic absorption for polyethylene. INHANCE 1750 shows a peak near 1700 $cm^{-1}$ which is due to the presence of carbonyl species. A small hump can be also seen at 1715 $cm^{-1}$ for INHANCE 1250.

(2) Particle Size Analysis of UHMWPE Particles

UHMWPE particles size and PSDs are shown in Table 3. The PSD is mentioned as D(v, 0.5), which is the volume average diameter i.e., the diameter where 50% of the distribution is above and 50% is below, D(v, 0.9), which means that 90% of the volume distribution is below this value and D(v, 0.1), which means that 10% of the volume distribution is below this value. Table 4 shows that INHANCE 1250 has the highest particle size and MIPELON PM 220 has the lowest particle size among the samples tested.

TABLE 3

| UHMWPE Grades | D(0.1) | D(0.5) (Average) | D(0.9) |
|---|---|---|---|
| MIPELON XM220-20 Kg batch; Lot No. H10B2154 | 18.608 | 32.692 | 60.135 |
| MIPELON XM220-2 Kg batch; Lot No. H10A2130 | 21.4 | 40.843 | 76.87 |
| MIPELON XM221U | 18.797 | 32.813 | 58.892 |
| MIPELON PM 220 | 7.137 | 10.434 | 15.119 |
| INHANCE 1250 | 37.395 | 63.871 | 104.038 |
| INHANCE 1750 | 12.968 | 22.419 | 38.546 |
| GUR 2126 | 17.294 | 32.399 | 58.664 |
| GUR X162 | 35.727 | 59.768 | 96.013 |

(3) Image Analysis of UHMWPE Particles

FIGS. 3-6 show SEM micrographs of UHMWPEs.
The SEM data in FIGS. 3-6 is summarized in Table 4.

TABLE 4

| Grade of UHMWPE | Source | Treatment | Particle Morphology |
|---|---|---|---|
| MIPELON XM 220 [Lot No. H10B2154] | Mitsui Chemicals | No | Spherical, discrete + agglomerated particles present + small particles (~<10 μm) |
| MIPELON XM220 [Lot No. H10A2130] | Mitsui Chemicals | No | Spherical, discrete + agglomerated particles present + small particles (~<10 μm) |
| MIPELON XM 221U | Mitsui Chemicals | No | Spherical, discrete + few agglomerated particles present (agglomerated particles less than MIPELON XM220 Lot No. H10B2154) |
| MIPELON PM 200 | Mitsui Chemicals | No | Spherical, discrete particles |
| GUR X162 | Ticona | No | Extremely rough surface - probably from fusion of many smaller particles |
| GUR 2126 | Ticona | No | Agglomerated particles |
| INHANCE 1750 | INHANCE Products | Yes (COOH groups) | Agglomerated particles |
| INHANCE 1250 | INHANCE Products | Yes (—COOH, —OH and C—F groups) | Discrete particles with irregular shape, rough surface |

(4) Wear and Friction Behavior of PEI-UHMWPE Compositions

Wear and friction behavior of PEI-10 wt % UHMWPE compositions were evaluated for KF and CoF at standard PV condition. The result is summarized in Table 5.

TABLE 5

KF AND COF OF PEI - 10 WT % UHMWPE COMPOSITIONS AT 2000 PV

| Grade of UHMWPE | KF @ 40 psi, 50 fpm in PEI + 10 wt % UHMWPE (inch$^3$ · min./ft · lb · hr) | CoF @ 40 psi, 50 fpm in PEI + 10 wt % UHMWPE |
|---|---|---|
| MIPELON XM 220 (Lot No. H10B2154) | 3300 | 0.32 |
| MIPELON XM220 (Lot No. H10A2130) | 1866 | 0.26 |
| MIPELON XM 221U | 1428 | 0.27 |
| MIPELON PM 200 | 2600 | 0.25 |
| GUR X162 | 1010 | 0.28 |
| GUR 2126 | 823 | 0.27 |
| INHANCE 1750 | 801 | 0.33 |
| INHANCE 1250 | 228 | 0.32 |

Figure 7:
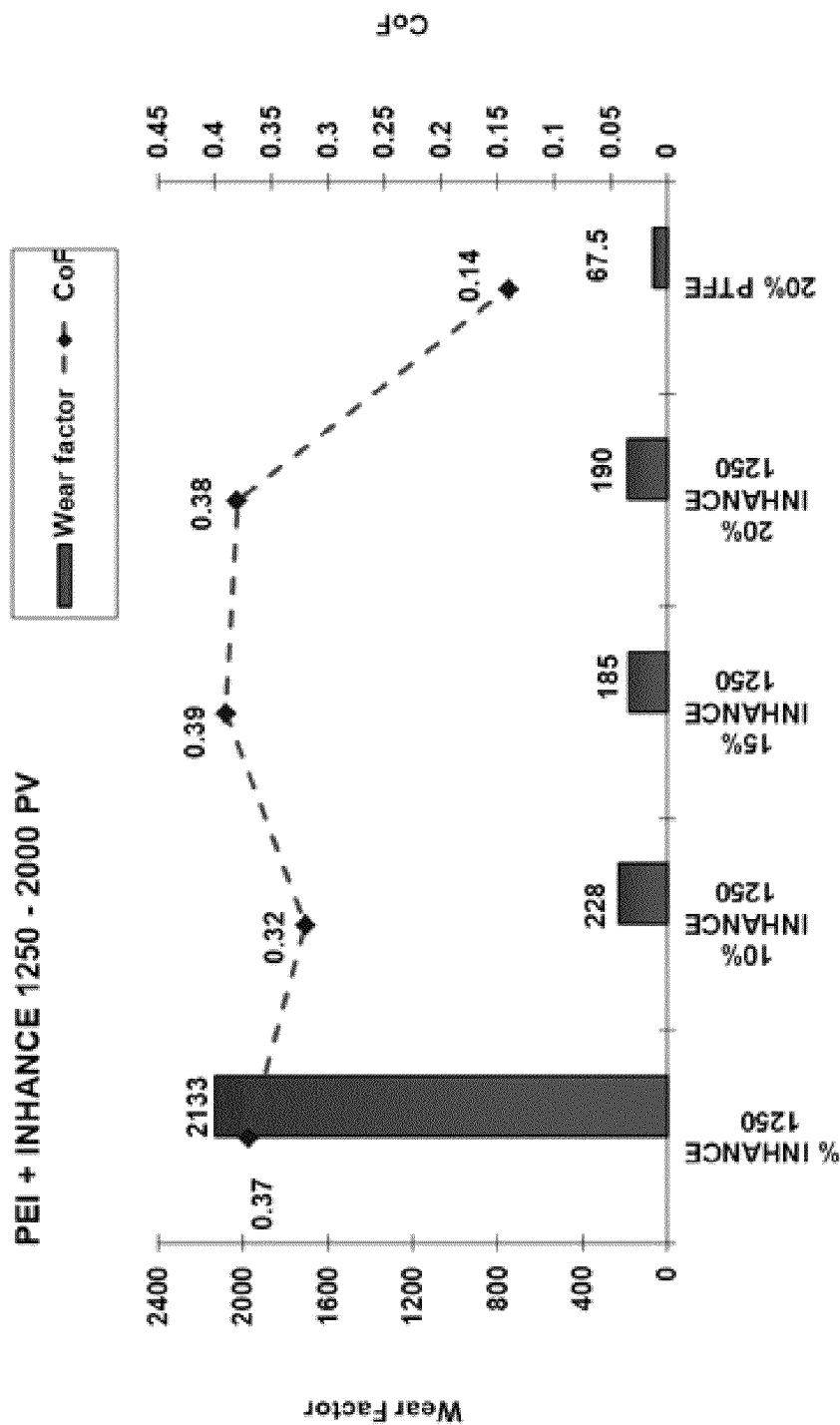
FIG. 7 shows wear data of PEI with varying loading levels of INHANCE 1250 at 40 psi, 50 fpm.

Pristine PEI have a KF of 8920 and CoF of 0.36 whereas PEI with 20 wt % PTFE have a KF of 67.5 and CoF of 0.138 at standard PV condition. It can be observed from the wear data that UHMWPE does show lubrication effect and reduces the KF significantly in PEI. INHANCE 1250 showed the lowest KF of 228 inch$^3$·min./ft·lb·hr among all the UHMWPE evaluated. The loading level of INHANCE 1250 in PEI was also studied. The loading of INHANCE 1250 was varied from 5 wt % to 20 wt %. The data is shown in FIG. 7. The data in FIG. 7 shows that at 2000 PV condition increased loading level of INHANCE 1250 does improve the lubrication behavior. PEI-20 wt % INHANCE 1250 have a KF of 190 and CoF of 0.38. PEI-20 wt % PTFE has a KF of 67.5 and CoF 0.14.

Figure 8:
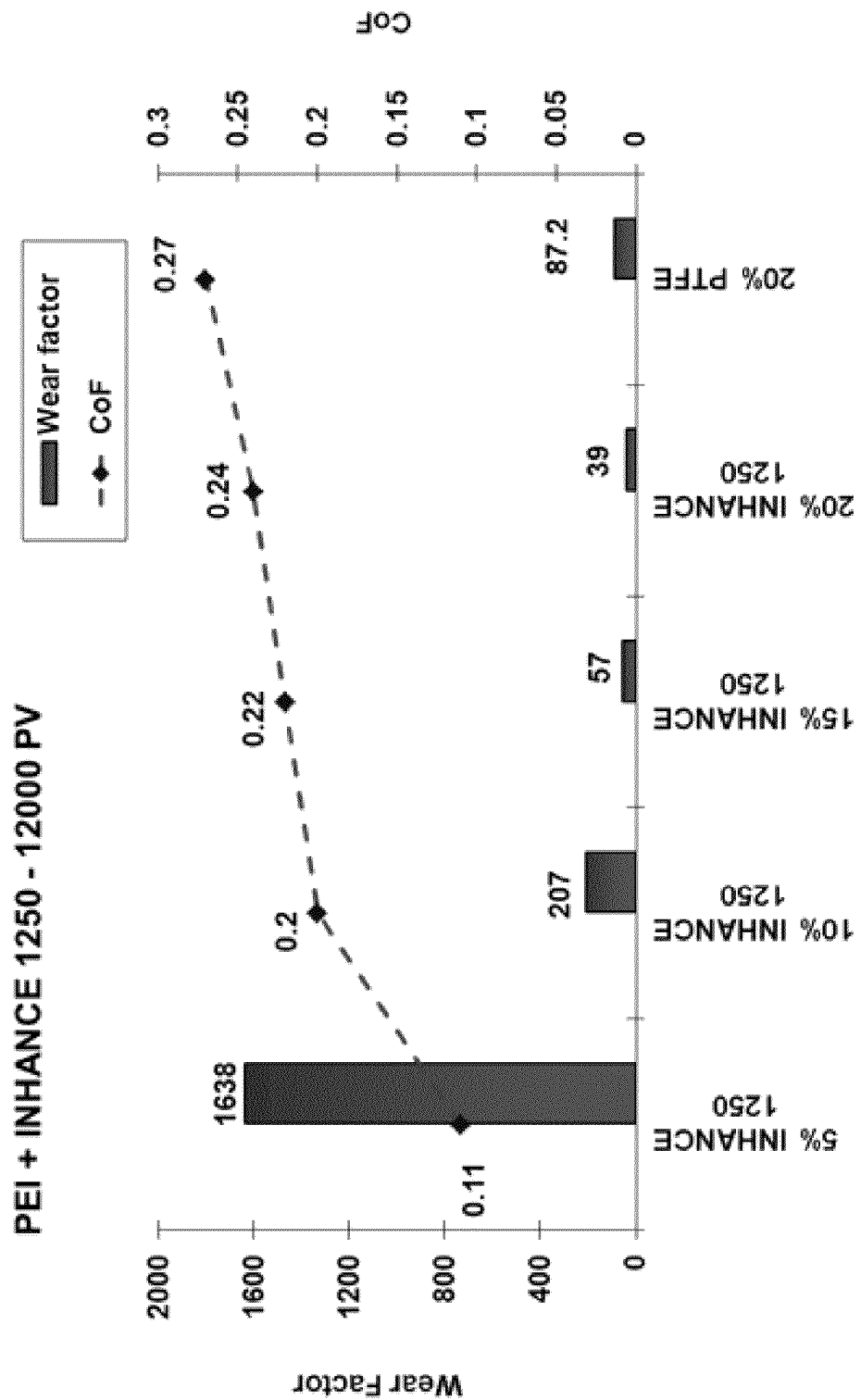
FIG. 8 shows wear data of PEI with varying loading levels of INHANCE 1250 at 120 psi, 100 fpm.

The data in FIG. 8 also shows that at 12000 PV condition, increased loading level of INHANCE 1250 does improve the lubrication behavior. It was observed that PEI-15 wt % INHANCE 1250 have a KF of 57 and CoF of 0.22, very similar to PEI-20 wt % PTFE composition.

Figure 9:
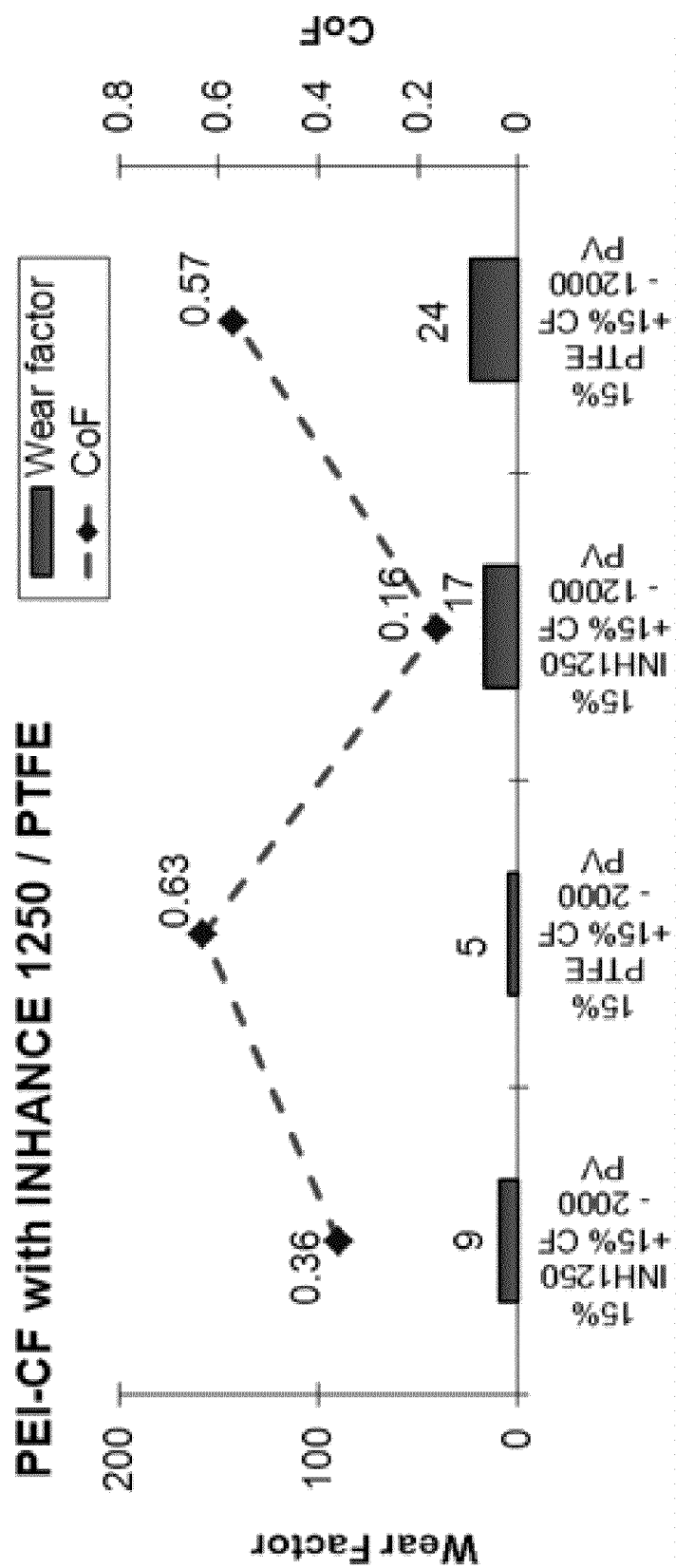
FIG. 9 shows wear data of PEI-INHANCE 1250-carbon fiber (CF) and PEI-PTFE-CF at 40 psi, 50 fpm.

The combination of UHMWPE with CF was also evaluated and compared against CF reinforced PTFE batches. Both the fiber and lubricating agent in the composition was 15 wt %. The data in FIG. 9 shows that at 2000 PV condition, PEI-15 wt % INHANCE 1250-15 wt % CF have a KF of 9 and CoF of 0.36 whereas PEI-15 wt % PTFE-15 wt % CF have a KF of 5 and CoF of 0.63. The un-lubricated reinforced composition, PEI-30 wt % CF have a KF of 120 and CoF value of 0.52. At 12000 PV condition, PEI-15 wt % INHANCE 1250-15 wt % CF have a KF of 17 and CoF of 0.16 whereas PEI-15 wt % PTFE-15 wt % CF have a KF of 24 and CoF of 0.57. Therefore, the compositions with INHANCE 1250 have a similar KF with better CoF compared to the control.

(5) Wear and Friction Behavior of PEEK-UHMWPE Compositions

The detailed evaluation of UHMWPE in PEI demonstrated that INHANCE 1250 provided the best wear behavior among all the UHMWPE evaluated. Hence, INHANCE 1250 was chosen in PEEK for evaluation. Pristine PEEK have a KF of 76 and CoF of 0.58 whereas PEEK with 20 wt % PTFE have a the KF of 18 and CoF of 0.25 at standard PV condition. The loading level of INHANCE 1250 in PEEK was also studied. The loading of INHANCE 1250 was varied from 10 wt % to 20 wt %.

Figure 10:
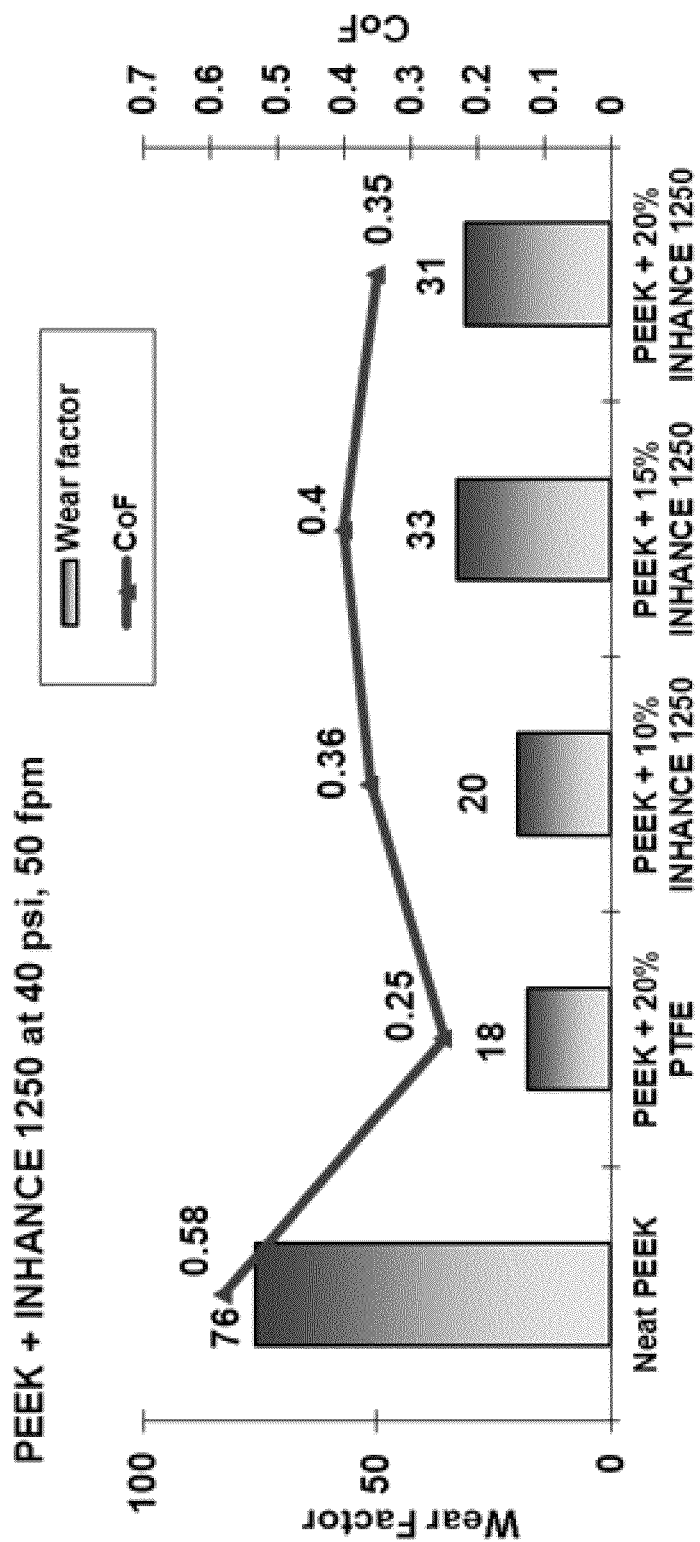
FIG. 10 shows wear data of PEEK with varying loading levels of INHANCE 1250 and PEEK with PTFE at 40 psi, 50 fpm.

It can be seen from FIG. 10 that at 2000 PV condition, PEEK-10 wt % INHANCE 1250 have a KF of 20 and CoF of 0.36, a very comparable wear behavior compared to PEEK-20 wt % PTFE composition.

Figure 11:
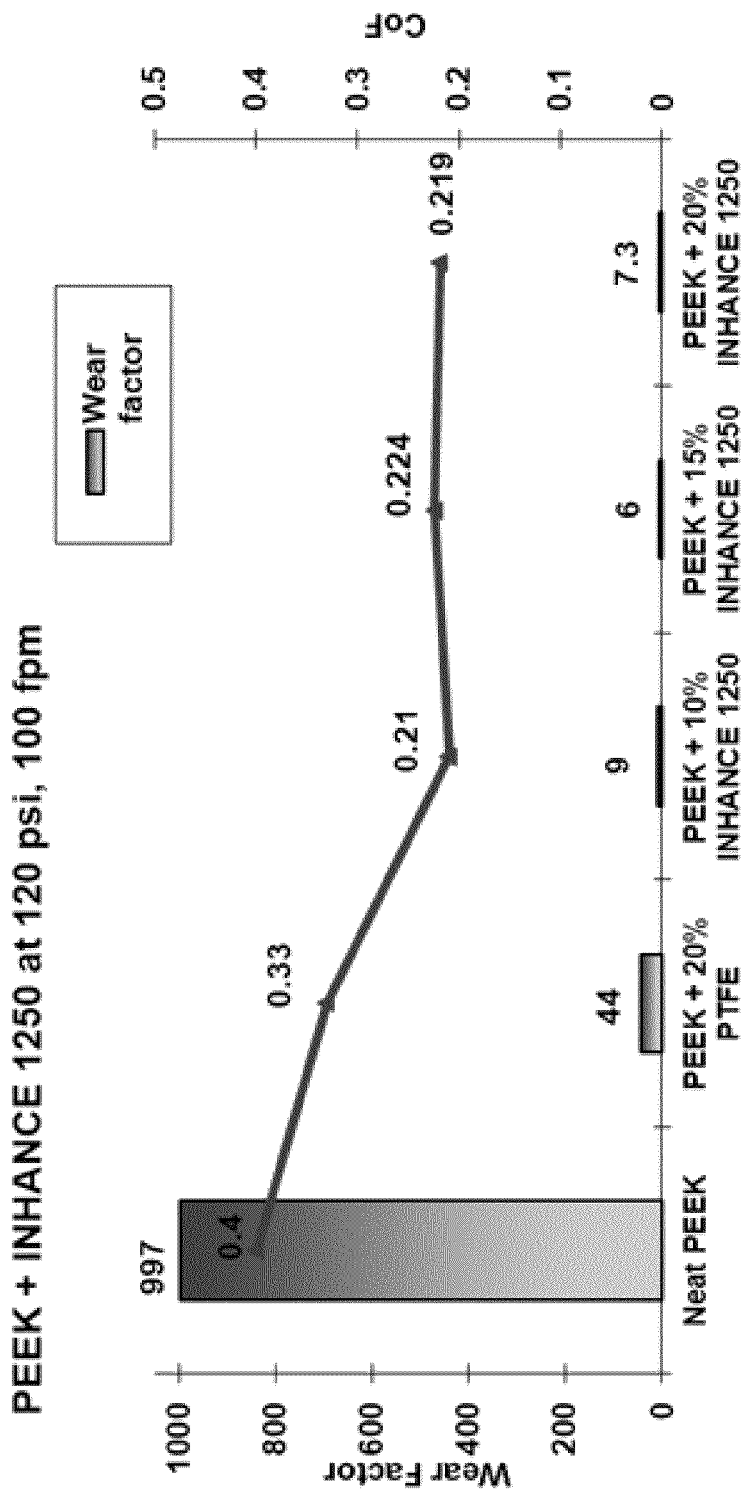
FIG. 11 shows wear data of PEEK with varying loading levels of INHANCE 1250 at 120 psi, 100 fpm.

The data in FIG. 11 shows that at high PV condition (12000 PV), PEEK-10 wt % INHANCE 1250 registered a KF of 9 and CoF of 0.21 whereas PEEK-20 wt % PTFE composition have a KF of 44 and CoF value of 0.33. Hence, the data in the study shows that UHMWPE performs similarly as PTFE for high temperature resin systems.

(6) Summary of Data

PEI-15 wt % UHMWPE composition showed wear behavior comparable to PEI-20 wt % PTFE composition at high pressure (P) and velocity (V) conditions.

PEI-15 wt % UHMWPE-15 wt % CF also showed similar KF and lower CoF compared to PEI-15 wt % PTFE-15 wt % CF compositions at both standard and high P and V conditions.

PEEK-10 wt % UHMWPE composition showed wear behavior comparable to 20 wt % PTFE composition at standard PV condition and improved wear behavior at high PV condition.

2. Example 2

Wear properties of UHMWPE filled PEI, PEEK, nylon 6, nylon 6,6, polyoxymethylene, and PBT compositions were compared to unfilled and PTFE filled compositions to judge its value proposition. ULTEM PEI resin and PEEK resin from Victrex were used in the following examples. PTFE was obtained from Dupont and carbon fibers were obtained from Grafil Inc., USA. Nylon 6 was obtained from DOMO Caproleuna GmbH. Nylon 6,6 was obtained from Ascend Performance Materials. Polyoxymethylene was obtained from Ticona. PBT was VALOX-brand obtained from SABIC Innovative Plastics.

The KF and CoF values for tables 6 to 11 were obtained at test conditions as follows: 40 psi and 50 fpm with a steel counter surface.

TABLE 6

KF AND COF OF FILLED NYLON 6

| | KF | CoF |
|---|---|---|
| 20% PTFE | 18 | 0.28 |
| 20% INHANCE 1250 | 29 | 0.48 |
| 15% PTFE + 30% Glass Fiber | 12 | 0.84 |
| 15% INHANCE 1250 + 30% Glass Fiber | 23 | 0.64 |
| 15% PTFE + 30% CF | 8.5 | 0.44 |
| 15% INHANCE 1250 + 30% CF | 9 | 0.35 |

TABLE 7

KF AND COF OF FILLED NYLON 6, 6

| | KF | CoF |
|---|---|---|
| 20% PTFE | 127 | 0.22 |
| 20% INHANCE 1250 | 87 | 0.27 |
| 15% PTFE + 30% Glass Fiber | 139 | 0.63 |
| 15% INHANCE 1250 + 30% Glass Fiber | 97 | 0.48 |
| 15% PTFE + 30% CF | 67 | 0.62 |
| 15% INHANCE 1250 + 30% CF | 190 | 0.18 |

TABLE 8

KF AND COF OF FILLED PEI

| | KF | CoF |
|---|---|---|
| 20% PTFE | 67.5 | 0.14 |
| 20% INHANCE 1250 | 190 | 0.38 |
| 15% PTFE + 15% Glass Fiber | 36 | 0.53 |
| 15% INHANCE 1250 + 15% Glass Fiber | 76 | 0.6 |
| 15% PTFE + 15% CF | 5 | 0.63 |
| 15% INHANCE 1250 + 15% CF | 9 | 0.36 |

TABLE 9

KF AND COF OF FILLED PEEK

| | KF | CoF |
|---|---|---|
| 20% PTFE | 18 | 0.25 |
| 10% INHANCE 1250 | 20 | 0.36 |
| 15% PTFE + 15% Glass Fiber | 5 | 0.41 |
| 10% INHANCE 1250 + 15% Glass Fiber | 17 | 0.61 |
| 15% PTFE + 15% CF | 11 | 0.25 |
| 10% INHANCE 1250 + 15% CF | 21 | 0.39 |

TABLE 10

KF AND COF OF FILLED PBT

| | KF | CoF |
|---|---|---|
| 20% PTFE | 24 | 0.32 |
| 20% INHANCE 1250 | 12 | 0.26 |
| 15% PTFE + 30% Glass Fiber | 116 | 0.64 |
| 15% INHANCE 1250 + 30% Glass Fiber | 135 | 0.57 |
| 15% PTFE + 30% CF | 14 | 0.58 |
| 15% INHANCE 1250 + 30% CF | 10 | 0.44 |

TABLE 11

KF AND COF OF FILLED POLYOXYMETHYLENE

| | KF | CoF |
|---|---|---|
| 15% PTFE | 66 | 0.21 |
| 15% INHANCE 1250 | 53 | 0.31 |
| 15% PTFE + 30% Glass Fiber | 1783 | 0.44 |
| 15% INHANCE 1250 + 30% Glass Fiber | 210 | 0.36 |
| 15% PTFE + 10% CF | 79 | 0.26 |
| 15% INHANCE 1250 + 10% CF | 52 | 0.38 |

The KF and CoF values for tables 12 and 13 were obtained at test conditions as follows: 120 psi and 100 fpm with a steel counter surface. The KF and CoF values for tables 14 to 17 were obtained at test conditions as follows: 100 psi and 100 fpm with a steel counter surface.

TABLE 12

KF AND COF OF FILLED PEI

| | KF | CoF |
|---|---|---|
| 20% PTFE | 87 | 0.27 |
| 20% INHANCE 1250 | 39 | 0.24 |
| 15% PTFE + 15% Glass Fiber | 62 | 0.46 |
| 15% INHANCE 1250 + 15% Glass Fiber | 114 | 0.36 |
| 15% PTFE + 15% CF | 24 | 0.57 |
| 15% INHANCE 1250 + 15% CF | 17 | 0.16 |

TABLE 13

KF AND COF OF FILLED PEEK

|  | KF | CoF |
|---|---|---|
| 20% PTFE | 44 | 0.33 |
| 10% INHANCE 1250 | 9 | 0.21 |
| 20% INHANCE 1250 | 7.3 | 0.22 |
| 15% PTFE + 15% Glass Fiber | 86 | 0.49 |
| 10% INHANCE 1250 + 15% Glass Fiber | 60 | 0.37 |
| 15% PTFE + 15% CF | 32 | 0.53 |
| 10% INHANCE 1250 + 15% CF | 33 | 0.43 |

TABLE 14

KF AND COF OF FILLED NYLON 6

|  | KF | CoF |
|---|---|---|
| 20% PTFE | 312 | 0.7 |
| 20% INHANCE 1250 | 7 | 0.46 |
| 15% PTFE + 30% Glass Fiber | 34 | 0.63 |
| 15% INHANCE 1250 + 30% Glass Fiber | 64 | 0.61 |
| 15% PTFE + 30% CF | 21 | 0.66 |
| 15% INHANCE 1250 + 30% CF | 25 | 0.48 |

TABLE 15

KF AND COF OF FILLED NYLON 6,6

|  | KF | CoF |
|---|---|---|
| 20% PTFE | 8 | 0.13 |
| 20% INHANCE 1250 | 10 | 0.24 |
| 15% PTFE + 30% Glass Fiber | 578 | 0.45 |
| 15% INHANCE 1250 + 30% Glass Fiber | 293 | 0.42 |
| 15% PTFE + 30% CF | 184 | 0.42 |
| 15% INHANCE 1250 + 30% CF | 199 | 0.23 |

TABLE 16

KF AND COF OF FILLED POLYBUTYLENE TEREPHTHALATE

|  | KF | CoF |
|---|---|---|
| 20% PTFE | PV failure | Ridge wore off |
| 20% INHANCE 1250 | 27 | 0.78 |
| 15% PTFE + 30% Glass Fiber | 54 | 0.53 |
| 15% INHANCE 1250 + 30% Glass Fiber | 91 | 0.55 |
| 15% PTFE + 30% CF | 24 | 0.57 |
| 15% INHANCE 1250 + 30% CF | 19 | 0.36 |

TABLE 17

KF AND COF OF FILLED POLYOXYMETHYLENE

|  | KF | CoF |
|---|---|---|
| 15% PTFE | 39 | 0.13 |
| 15% INHANCE 1250 | 8 | 0.21 |
| 15% PTFE + 30% Glass Fiber | 494 | 0.22 |
| 15% INHANCE 1250 + 30% Glass Fiber | 771 | 0.35 |
| 15% PTFE + 10% CF | 114 | 0.18 |
| 15% INHANCE 1250 + 10% CF | 174 | 0.29 |

The KF and CoF values for Table 18 were obtained at test conditions as follows: 40 psi and 50 fpm with a steel counter surface. The KF and CoF values for Table 19 were obtained at test conditions as follows: 120 psi and 100 fpm with a steel counter surface.

TABLE 18

KF AND COF OF FILLED PEI

| PEI | KF at 40 psi, 50 fpm | CoF at 40 psi, 50 fpm |
|---|---|---|
| 20% PTFE | 67.5 | 0.14 |
| 20% Surface Treated INHANCE 1250 | 190 | 0.38 |
| 20% Untreated INHANCE 1250 | 2711 | 0.31 |
| 20% Hizex Million | 3324 | 0.33 |

TABLE 19

KF AND COF OF FILLED PEI

| PEI | KF at 120 psi, 100 fpm | CoF at 120 psi, 100 fpm |
|---|---|---|
| 20% PTFE | 87 | 0.27 |
| 20% Surface Treated INHANCE 1250 | 39 | 0.24 |
| 20% Untreated INHANCE 1250 | 1244 | 0.17 |
| 20% Hizex Million | 1139 | 0.18 |

The data from Tables 18 and 19 shows that surface treated INHANCE 1250 has a lower KF than untreated INHANCE 1250. Hizex Million is an UHMWPE manufactured and sold by Mitsui Petrochemical Industries. Hizex Million is untreated and therefore has no surface modifiers. The data from Tables 18 and 19 shows that surface treated INHANCE 1250 has a lower KF than Hizex Million (untreated UHMWPE). The data in Tables 12 and 19 shows that, at 120 psi and 100 fpm, treated INHANCE 1250 has a lower KF and CoF than PTFE. The data also shows that surface treated INHANCE 1250 has improved KF and CoF properties at higher pressure and velocity. However, the data in Tables 8 and 18 shows that, at 40 psi and 50 fpm, PTFE has a lower KF and CoF than treated INHANCE 1250. Thus, surface treated INHANCE 1250 has improved KF and CoF properties at higher pressures and velocities while PTFE has decreased KF and CoF properties at higher pressures and velocities.

(1) Conclusion of Data

At 40 psi, 50 fpm, PA6, PA66, PEEK, PBT and polyoxymethylene (POM) showed similar or lower KF compared to PTFE compositions. PEI have a similar KF as PTFE composition for CF filled composites. CoF of glass fiber and CF composites were comparable to PTFE compositions for the polymers above whereas the unfilled composition of INHANCE showed marginally higher CoF than PTFE composition.

At high PV condition, unfilled and CF filled composite of INHANCE showed comparable KF as PTFE compositions though glass filled compositions showed higher KF. INHANCE compositions showed similar or better CoF at all compositions compared to PTFE.

3. Example 3

The compositions tested in Example 3 are described in Table 20.

TABLE 20

FORMULATIONS

| Materials | Formulations | | | |
|---|---|---|---|---|
| | 1 | 2 | 3 | 4 |
| PPA | 70 | 70 | | |
| PEEK | | | 70 | 70 |
| PTFE | 15 | | 15 | |
| UHMWPE (INHANCE 1250) | | 15 | | 15 |
| CF | 15 | 15 | 15 | 15 |

The materials were compounded in a ten barrel 40 mm twin screw extruder with an FR screw. The PEEK or PPA resin were added at the feed throat, PTFE/UHMWPE were fed through port 4 and the carbon fiber was fed through port 6. The barrel temperatures ranged from 560° F. to 590° F. for PPA and 700° F. to 730° F. for PEEK. The screw speed was 200 to 250 rpm and the feed rate was 100 lbs/hr. Test parts were injection molded with barrel temperatures 575° F. to 600° F. for PPA and 700° F. to 730° F. for PEEK and mold temperature was set to 260° F. to 280° F. for PPA and 310° F. to 330° F. for PEEK.

The test employed of the above compositions was a High-PV thrust bearing wear test based on General Motors Powertrain (GMPT) limiting PV test protocol, sequence B (modified ASTM D3702) utilizing engineering plastic thrust washer test specimens rotated against a carbon steel countersurface. The GMPT protocols are very different from standard Limiting PV procedures. The test conditions are much more severe and the materials can survive multiple steps only due to the short run duration at each condition and the cool down time allowed between steps.

Three 0.25"×0.25"×0.13" square pins were cut from the plastic sample and placed 120° apart on a 0.938" mean sample diameter circle. The counter-surface was annealed AISI 1018 carbon steel machined to a 16+/−2 micro-inch (AA) surface finish. The test specimens were rotated under load without lubrication against the stationary steel counter-surface in air at ambient conditions for fixed time periods. Wear rate, coefficient of friction, and counter-surface temperature were measured as the material progressed through a matrix of pressures and velocities. All tests were conducted by Lewis Research, Inc. on a LRI-1a Thrust Bearing Tribometer.

The thermoplastic test specimens were subject to a break-in prior to the test at specific PV conditions for a period of time to achieve at least 90% contact. After the break-in, Sequence B testing were conducted utilizing high velocity and low pressure. It started with the lowest PV of 50,000 psi-ft/min. The samples were tested for 5 minutes at the specified speed & load for a given step, then stop for 30 minutes before going to the next test step. The PV testing continued at 25,000 PV increments. If the sample survived 200,000 PV, the steps were changed from 25,000 PV increments to 50,000 PV increments for the subsequent runs until the samples failed. Three tests were conducted for each material.

Figure 12A:
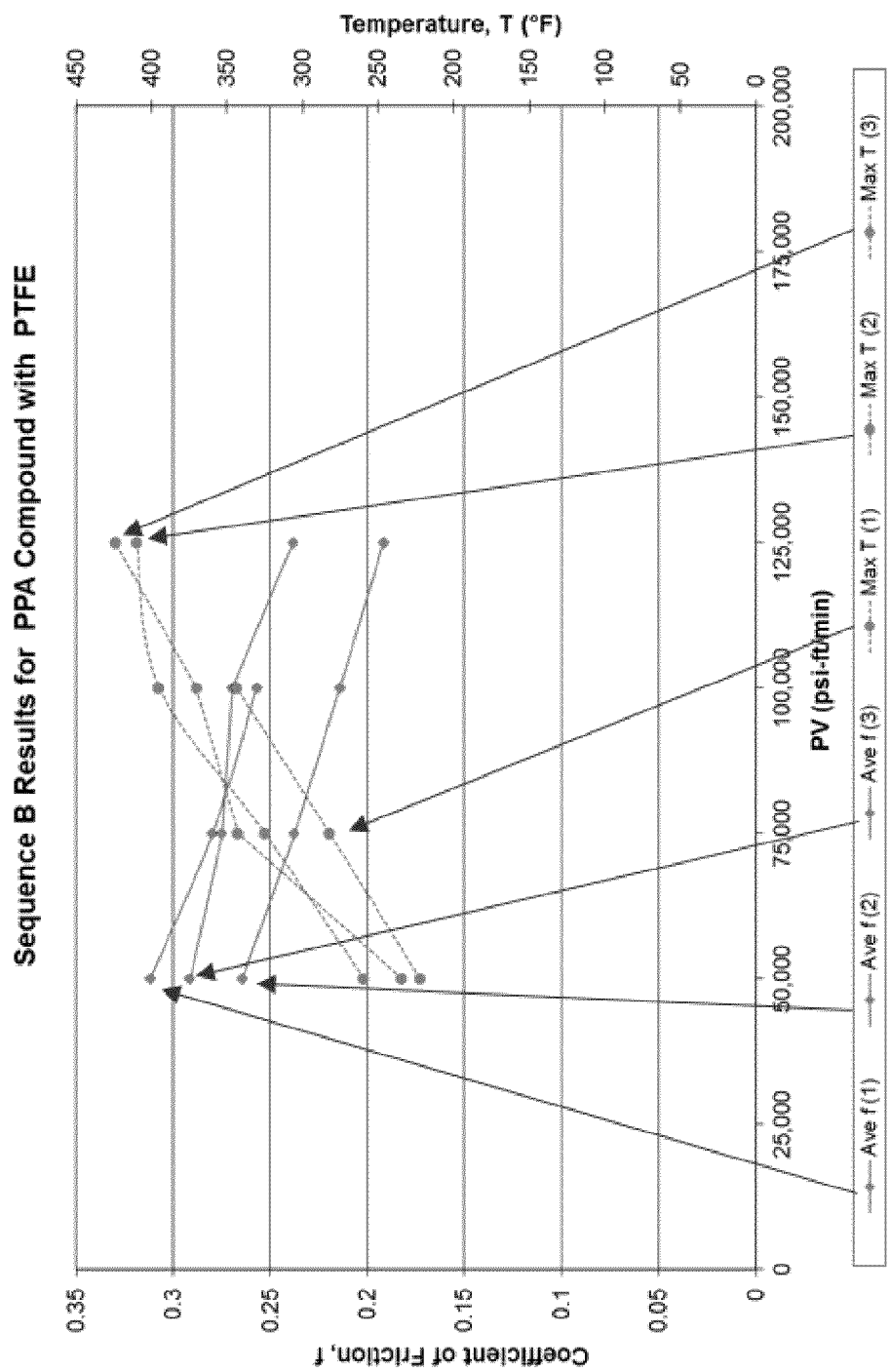
FIG. 12A shows GMPT limiting PV Sequence B test results for PPA with PTFE as the lubricant.
Figure 12B:
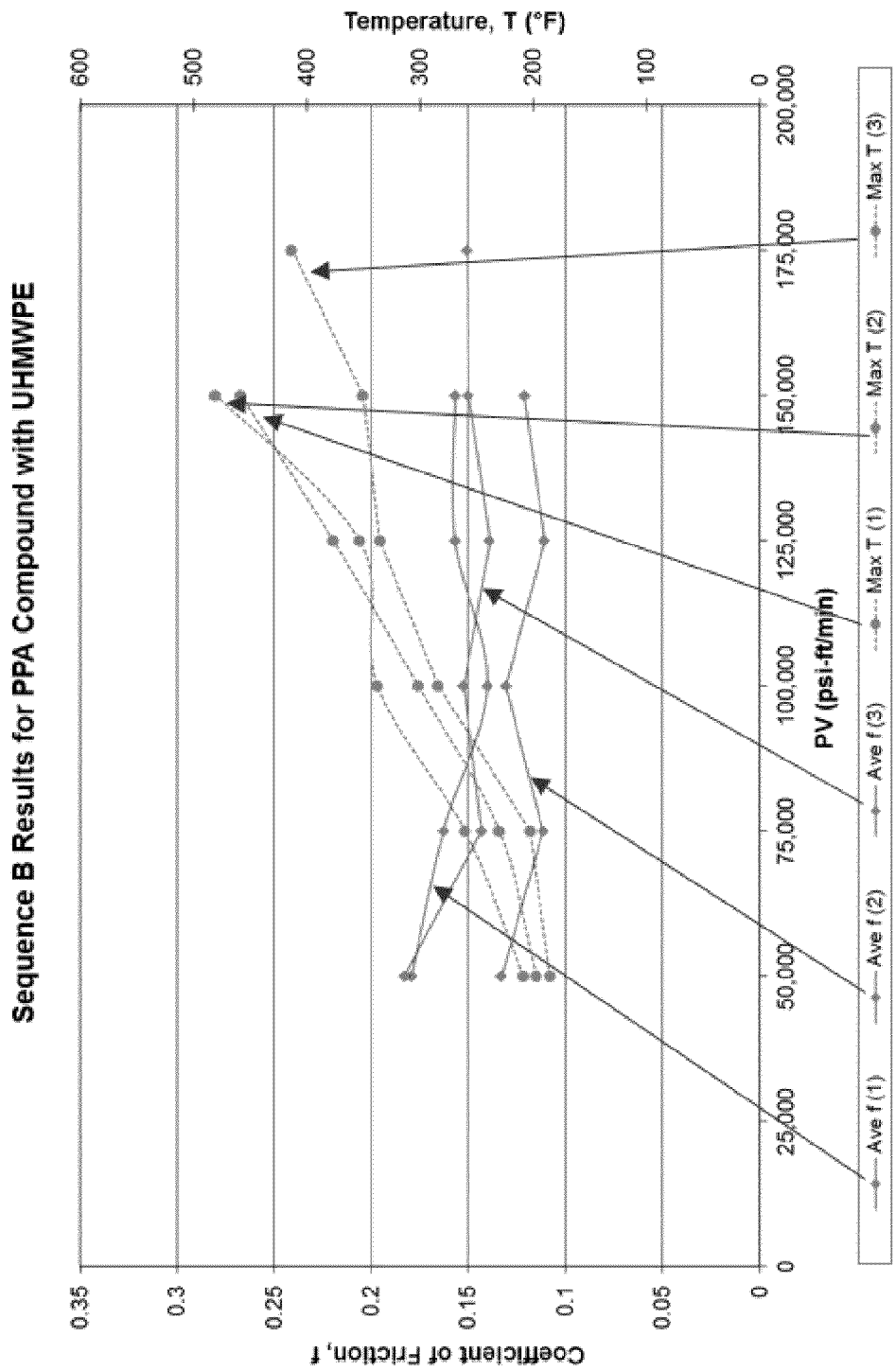
FIG. 12B show GMPT limiting PV Sequence B test results for PPA with INHANCE 1250UHMWPE as the lubricant.

FIGS. 12A and 12B show the results for the GMPT limiting PV Sequence B tests for the carbon fiber filled PPA compounds with the wear additives PTFE and INHANCE 1250 UHMWPE respectively. Table 21 summarizes the results. The PPA material with the PTFE lubricant failed at ~117,000 PV while the same material with the surface modified UHMWPE additive failed at ~158,000 PV. The average coefficient of friction for the UHMWPE filled PPA material was lower than that of the PTFE filled PPA material. The melting point of INHANCE 1250 UHMWPE is 142 C (~288° F.); surprisingly the UHMWPE filled PPA materials survived much higher frictional temperatures. The failure temperature was in the range of ~410° F.-480° F.

TABLE 21

GMPT LIMITING PV SEQUENCE B TEST DATA SUMMARY FOR PPA WITH PTFE OR INHANCE 1250 AS LUBRICANTS

| Material | Sample # | PV at Failure | Ave. PV at Failure | Ave Coefficient of Friction | Temp (° F.) at Failure |
|---|---|---|---|---|---|
| PPA with PTFE | 1 | 100,000 | 116,667 | 0.28 | 344 |
| | 2 | 125,000 | | 0.23 | 410 |
| | 3 | 125,000 | | 0.27 | 424 |
| PPA with UHMWPE | 1 | 150,000 | 158,333 | 0.16 | 458 |
| | 2 | 150,000 | | 0.12 | 481 |
| | 3 | 175,000 | | 0.15 | 413 |

Figure 13A:
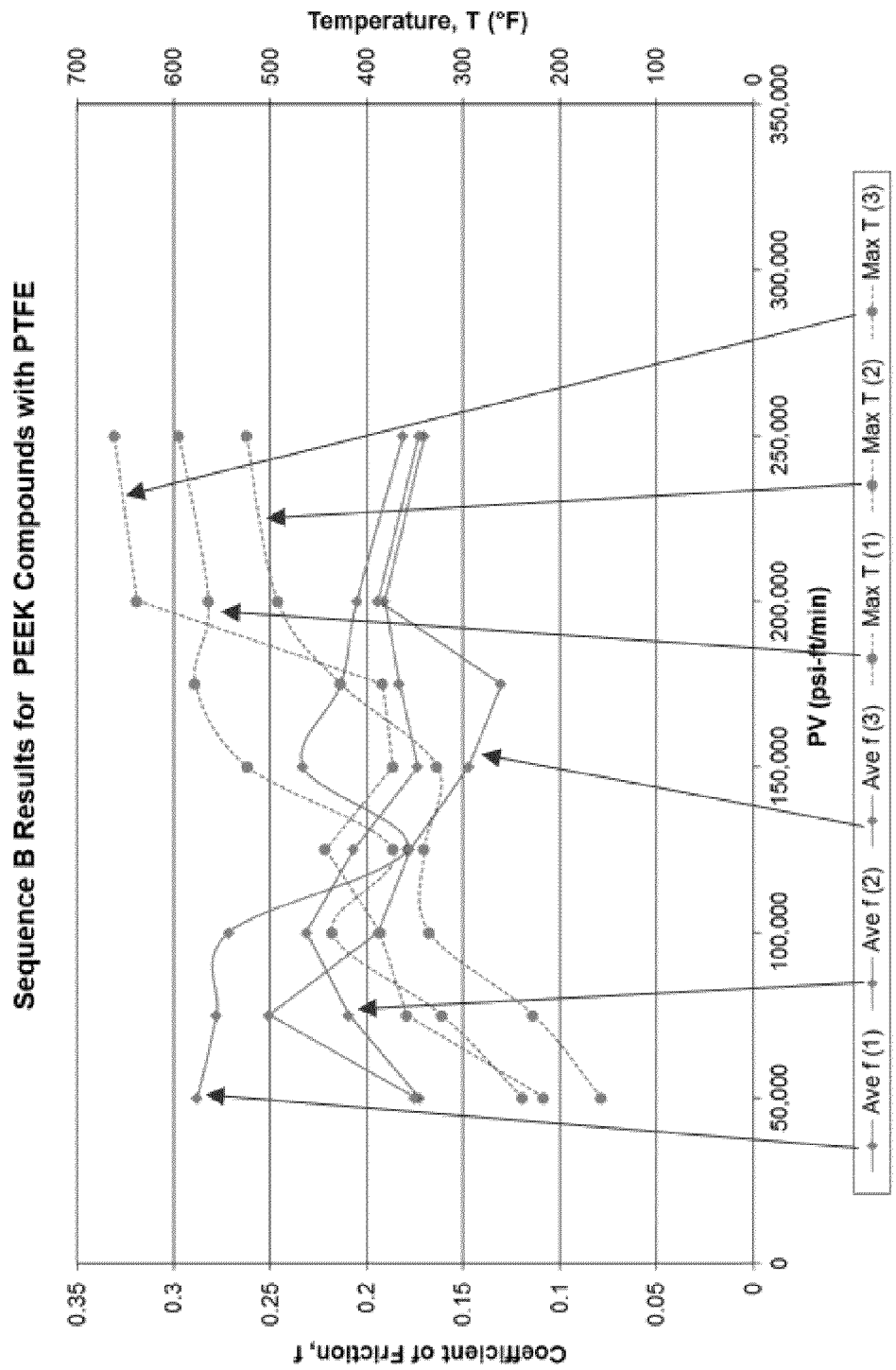
FIG. 13A shows GMPT limiting PV Sequence B test results for PEEK with PTFE as lubricant.
Figure 13B:
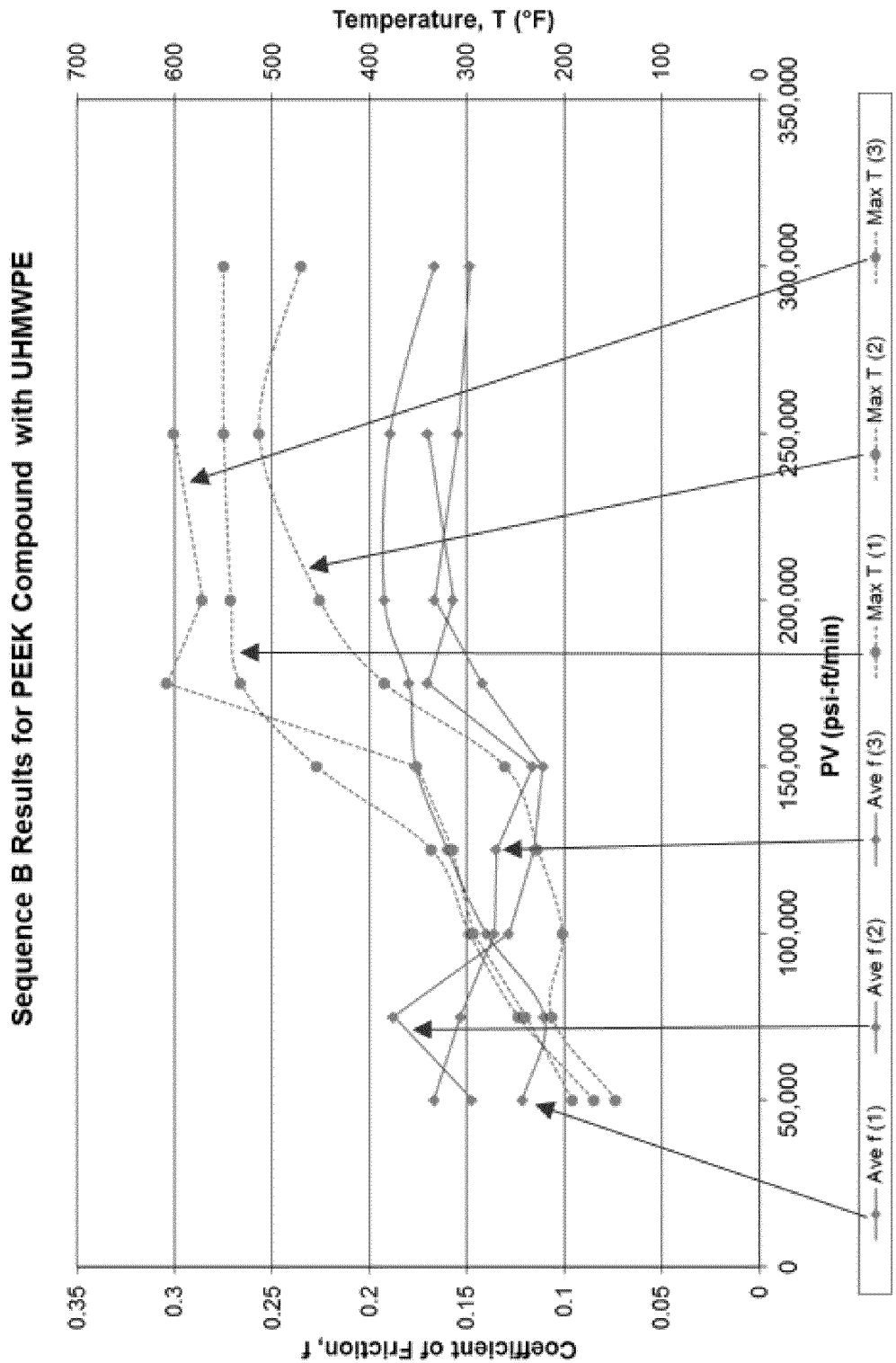
FIG. 13B shows GMPT limiting PV Sequence B test results for PEEK with INHANCE 1250UHMWPE as lubricant.

FIGS. 13A and 13B show the results for the GMPT limiting PV Sequence B tests for the carbon fiber filled PEEK compounds with the wear additives PTFE and INHANCE 1250 UHMWPE respectively. Table 2 summarizes some of the key findings. The PEEK material with the PTFE lubricant failed at ~250,000 PV while the same material with the surface modified UHMWPE additive failed at ~267,000 PV. The average coefficient of friction for the UHMWPE filled PEEK material was lower than that of the PTFE filled PEEK material. Again the UHMWPE filled PEEK materials survived much higher frictional temperatures than the melting point of INHANCE 1250 UHMWPE. The failure temperature was in the range of ~470° F.-600° F.

TABLE 22

GMPT LIMITING PV SEQUENCE B TEST DATA SUMMARY FOR PPA WITH PTFE OR INHANCE 1250 UHMWPE AS LUBRICANTS

| Material | Sample # | PV at Failure | Ave. PV at Failure | Ave. Coefficient of Friction | Temp (° F.) at Failure |
|---|---|---|---|---|---|
| PEEK with PTFE | 1 | 250,000 | 250,000 | 0.23 | 595 |
| | 2 | 250,000 | | 0.19 | 525 |
| | 3 | 250,000 | | 0.25 | 662 |
| PEEK with UHMWPE | 1 | 250,000 | 266,667 | 0.16 | 550 |
| | 2 | 300,000 | | 0.14 | 470 |
| | 3 | 250,000 | | 0.15 | 600 |

F. References

[1] B. Derbyshire, J. Fisher, D. Dowson, Wear 181-183, at pp. 258-262 (1995).
[2] M. Kernick, C. Allen, Wear 203, at pp. 537-543 (1997).
[3] J. Song, P. Liu, M. Cremens, Wear 225-229, at pp. 716-723 (1999).
[4] Z. Yao, Z. Yin, G. Sun, C. Z. Liu, J. Appl. Polym. Sci. 75, at pp. 232-238 (2000).
[5] C. Z. Liu. J. Q. Wu, J. Q. Li, L. Q. Ren, J. Tong, A. D. Arnell, Wear 260, at pp. 109-115 (2006).
[6] A. Lucas, J. D. Ambrósio, H. Otaguro, L. C. Costa, J. A. Agnelli, Wear 270, at pp. 576-583 (2011).
[7] C. Z. Liu, L. Q. Ren, J. Tong, S. M. Green, R. D. Arnell, Wear 253, at pp. 878-884 (2002).
[8] C. Z. Liu, L. Q. Ren, J. Tong, T. J. Joyce, S. M. Green, R. D. Arnell, Wear 249, at pp. 31-36 (2001).

What is claimed is:

1. A composition, comprising:
   (a) from about 30% by weight to about 97% by weight of polymer, wherein the polymer comprises polyetherimide, polyetheretherketone, polyamide, polyoxyalkylene, polyalkylene terephthalate, or a mixture thereof; and
   (b) from about 3% by weight to about 30% by weight ultra-high molecular weight polyethylene, wherein the ultra-high molecular weight polyethylene comprises above 0% by weight to about 10% by weight of a surface modifier, wherein the surface modifier comprises a halogen.

2. The composition of claim 1, wherein the composition further comprises from about 10% by weight to about 60% by weight reinforcement agent.

3. The composition of claim 1, wherein the reinforcement agent comprises glass or carbon fiber.

4. The composition of claim 1, wherein the halogen is fluorine or chlorine.

5. The composition of claim 1, wherein the surface modifier further comprises a carboxyl, hydroxyl, or carbonyl moiety, or a combination thereof.

6. The composition of claim 1, wherein the ultra-high molecular weight polyethylene comprises from about 0.01% by weight to 0.5% by weight of the surface modifier.

7. The composition of claim 1, wherein the polymer is polyetherimide.

8. The composition of claim 1, wherein the polymer is polyetheretherketone.

9. The composition of claim 1, wherein the polymer is a polyalkylene terephthalate.

10. The composition of claim 1, wherein the polymer is a polyoxyalkylene.

11. The composition of claim 1, wherein the composition comprises from about 10% by weight to about 20% by weight ultra-high molecular weight polyethylene.

12. The composition of claim 1, wherein the composition comprises from about 10% by weight to about 60% by weight reinforcement agent, from about 10% by weight to about 20% by weight ultra-high molecular weight polyethylene, and from about 30% by weight to about 80% by weight of the polymer comprising polyetherimide, polyetheretherketone, polyamide, polyoxyalkylene, or polyalkylene terephthalate, or a mixture thereof.

13. The composition of claim 1, wherein the composition has a wear factor of less than about 50 as determined by a test according to ASTM D3702 at about 120 psi and about 100 ft/min.

14. The composition of claim 1, wherein the composition has a pressure-velocity at failure of between about 150,000 PV and about 300,000 PV using the General Motors Powertrain limiting pressure-velocity test protocol, sequence B.

15. A composition comprising:
   (a) from about 30% by weight to about 97% by weight of polymer, wherein the polymer comprises polyetherimide, polyetheretherketone, polyoxyalkylene, polyalkylene terephthalate, or a mixture thereof; and
   (b) from about 3% by weight to about 30% by weight ultra-high molecular weight polyethylene, wherein the ultra-high molecular weight polyethylene comprises above 0% by weight to about 10% by weight of a surface modifier.

16. The composition of claim 15, wherein the composition further comprises from about 10% by weight to about 60% by weight reinforcement agent.

17. The composition of claim 15, wherein the reinforcement agent comprises carbon fiber or glass fiber.

18. The composition of claim 15, wherein the surface modifier comprises fluorine or chlorine.

19. The composition of claim 15, wherein the surface modifier further comprises a carboxyl, hydroxyl, or carbonyl moiety, or a combination thereof.

20. The composition of claim 15, wherein the ultra-high molecular weight polyethylene comprises from about 0.01% by weight to 0.5% by weight of the surface modifier.

21. The composition of claim 15, wherein the polymer is polyetherimide.

22. The composition of claim 15, wherein the polymer is polyetheretherketone.

23. The composition of claim 15, wherein the polymer is a polyalkylene terephthalate.

24. The composition of claim 15, wherein the polymer is a polyoxyalkylene.

25. The composition of claim 15, wherein the composition comprises from about 10% by weight to about 20% by weight ultra-high molecular weight polyethylene.

26. The composition of claim 15, wherein the composition comprises from about 10% by weight to about 60% by weight reinforcement agent, from about 10% by weight to about 20% by weight ultra-high molecular weight polyethylene, and from about 30% by weight to about 80% by weight of the polymer comprising polyetherimide, polyetheretherketone, polyamide, polyoxyalkylene, or polyalkylene terephthalate, or a mixture thereof.

27. The composition of claim 15, wherein the composition has a wear factor of less than about 50 as determined by a test according to ASTM D3702 at about 120 psi and about 100 ft/min.

28. The composition of claim 15, wherein the composition has a pressure-velocity at failure of between about 150,000 PV and about 300,000 PV using the General Motors Powertrain limiting pressure-velocity test protocol, sequence B.

* * * * *